(12) United States Patent
Watanabe et al.

(10) Patent No.: US 10,976,619 B2
(45) Date of Patent: Apr. 13, 2021

(54) ILLUMINATION DEVICE AND DISPLAY DEVICE

(71) Applicant: SHARP KABUSHIKI KAISHA, Sakai (JP)

(72) Inventors: Hisashi Watanabe, Sakai (JP); Hirotoshi Yasunaga, Sakai (JP); Youzou Kyoukane, Sakai (JP); Takeshi Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/666,229

(22) Filed: Oct. 28, 2019

(65) Prior Publication Data

US 2020/0159078 A1    May 21, 2020

(30) Foreign Application Priority Data

Nov. 16, 2018  (JP) .............................. JP2018-215677

(51) Int. Cl.
  *G02F 1/1362* (2006.01)
  *G02F 1/13357* (2006.01)

(52) U.S. Cl.
  CPC .. *G02F 1/136209* (2013.01); *G02F 1/133603* (2013.01); *G02F 1/133606* (2013.01)

(58) Field of Classification Search
  CPC ............................................... G02F 1/136209
  See application file for complete search history.

(56) References Cited

U.S. PATENT DOCUMENTS

| | | |
|---|---|---|
| 2009/0003002 A1 | 1/2009 | Sato |
| 2010/0061096 A1 | 3/2010 | Sato |
| 2012/0224111 A1 | 9/2012 | Ohshima |
| 2013/0169905 A1* | 7/2013 | Ouchi ............... G02F 1/133603 349/67 |
| 2016/0085118 A1* | 3/2016 | Lee ........................... G02F 1/29 349/62 |
| 2019/0051801 A1* | 2/2019 | Seo ......................... H01L 33/10 |
| 2019/0302548 A1* | 10/2019 | Lee ....................... H01L 27/124 |
| 2020/0043976 A1* | 2/2020 | Kim ....................... H01L 27/156 |

FOREIGN PATENT DOCUMENTS

| | | |
|---|---|---|
| JP | 4280283 B2 | 6/2009 |
| JP | 2012-182023 A | 9/2012 |

* cited by examiner

*Primary Examiner* — Sang V Nguyen
(74) *Attorney, Agent, or Firm* — ScienBiziP, P.C.

(57) ABSTRACT

A backlight device (illumination device) is provided with LEDs (light sources) and a light-controlling sheet (light-controlling member) that is arranged at the exit side of the outgoing-light path of the LEDs. The light-controlling sheet has a light-transmitting layer that transmits light, first light-shielding sections that are arranged at the LED side of the light-transmitting layer, and a second light-shielding section that is arranged at the opposite side to the first light-shielding section side of the light-transmitting layer. The first light-shielding sections and the second light-shielding section are repeatedly arranged side-by-side in an alternating manner.

1 Claim, 18 Drawing Sheets

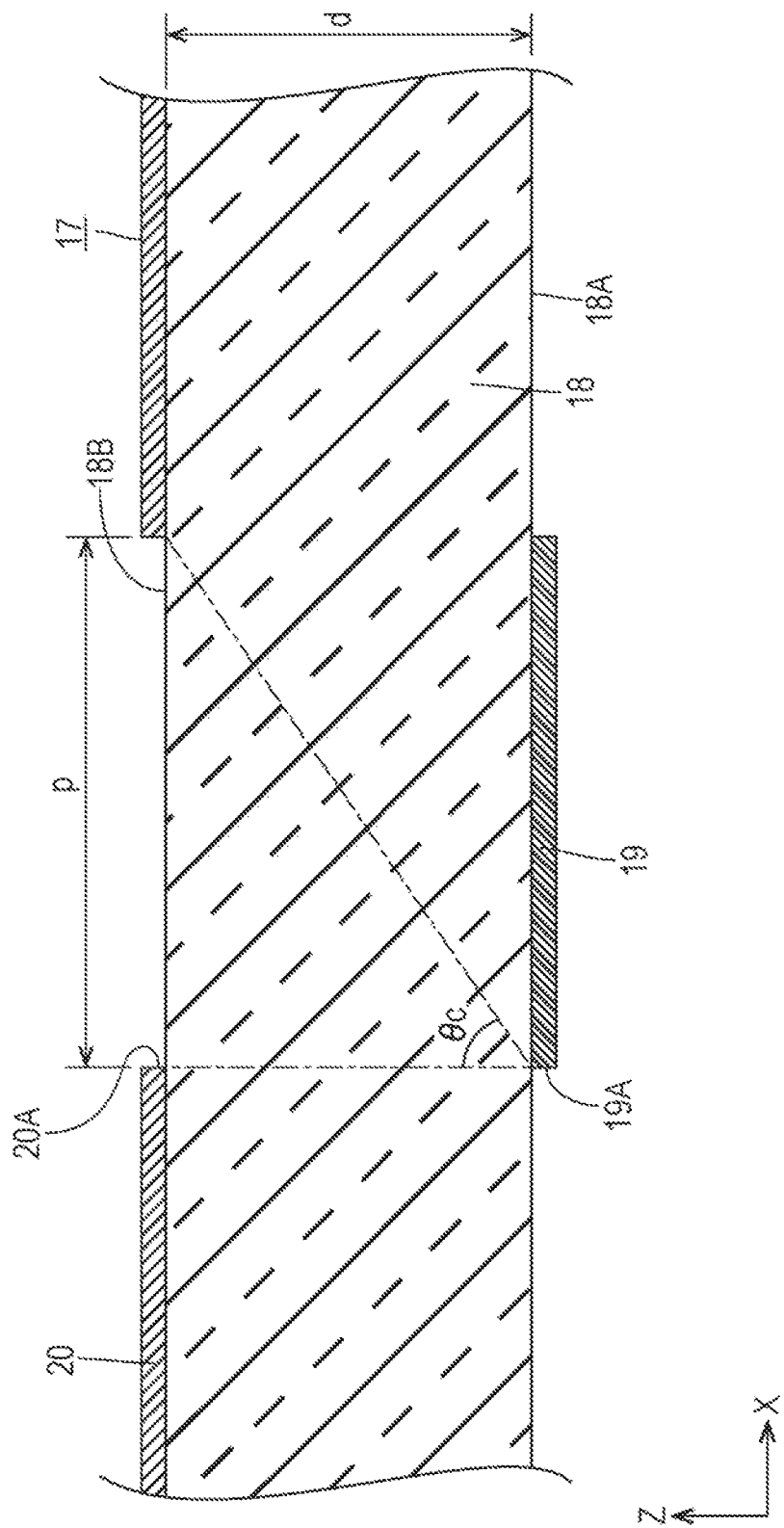

ILLUMINATION DEVICE AND DISPLAY DEVICE

BACKGROUND

1. Field

The present disclosure relates to an illumination device and a display device.

2. Description of the Related Art

The devices described in Japanese Patent No. 4280283 and Japanese Unexamined Patent Application Publication No. 2012-182023 are conventionally known examples of illumination devices used in liquid crystal display devices and the like. Japanese Patent No. 4280283 describes a planar illumination light source device that is an illumination device, configured of a light-emitting source having high directivity, a light guide having a radiating surface in the radiation direction of the light-emitting source, and a casing that is arranged around the light-emitting source and encloses surfaces other than the radiating surface of the light guide. The planar illumination light source device is provided with an inside reflection unit that is provided between the entirety of the casing and the light guide, and a radiating-side reflection unit that causes light from the light-emitting source to be reflected at a predetermined ratio. Furthermore, Japanese Unexamined Patent Application Publication No. 2012-182023 describes a planar light source device that is an illumination device, having: a light-emitting unit that has an element array surface on which a plurality of light-emitting elements are arrayed; and a light guide plate that is laminated on the element array surface, the light guide plate being configured so that both surfaces are flat and light that is radiated by the light-emitting elements toward an incoming-side surface is propagated within the light guide plate and extracted from an outgoing-side surface on the opposite side to the incoming-side surface. A plurality of recesses that house the light-emitting elements are formed in the element array surface of the light-emitting unit. The outgoing-side surface of the light guide plate is processed so as to reflect at least some light emitted from the light-emitting elements toward the outgoing-side surface, in a non-total reflection region which is positioned opposing the light-emitting elements and in which the angle of incidence of the light is less than the critical angle. The incoming-side surface of the light guide plate is processed so as to diffuse and reflect light.

In the planar illumination light source device described in Japanese Patent No. 4280283, the radiating-side reflection unit that causes light from the light-emitting source to be reflected at a predetermined ratio is composed of reflection dots having a sparseness in distribution corresponding to the distance from the light-emitting source. Therefore, if the light guide having the reflection dots formed on the radiating surface is not aligned in a precise manner with respect to the light-emitting source, there is a risk that the optical function of the reflection dots will not be appropriately exhibited and luminance irregularities will occur in the outgoing light from the light guide. Furthermore, in the planar light source device described in Japanese Unexamined Patent Application Publication No. 2012-182023, white reflective films are formed on surfaces as the processing for the outgoing-side surface and incoming-side surface of the light guide plate. The white reflective film on the outgoing-side surface is formed in the non-total reflection region, whereas the white reflective film on the incoming-side surface has a sparseness in distribution corresponding to the distance from the light-emitting source. Therefore, if the light guide having the white reflective films formed on the outgoing-side surface and incoming-side surface is not aligned in a precise manner with respect to the light-emitting elements, there is a risk that the optical function of the white reflective films will not be appropriately exhibited and luminance irregularities will occur in the outgoing light from the light guide.

The present disclosure has been completed based on circumstances such as the aforementioned, and suppresses luminance irregularities without requiring precise alignment.

SUMMARY

One embodiment of the present disclosure is an illumination device provided with: a light source; and a light-controlling member that is arranged at the exit side of the outgoing-light path of the light source, and has a light-transmitting layer that transmits light, a first light-shielding section that is arranged at the light source side of the light-transmitting layer, and a second light-shielding section that is arranged at the opposite side to the first light-shielding section side of the light-transmitting layer, in which the first light-shielding section and the second light-shielding section are repeatedly arranged side-by-side in an alternating manner.

BRIEF DESCRIPTION OF THE DRAWINGS

FIG. 3 is an enlarged cross-sectional view of the light-controlling sheet;

DESCRIPTION OF THE EMBODIMENTS

Embodiment 1

Embodiment 1 of the present disclosure will be described using FIGS. 1 to 3. In the present embodiment, an example is given for a liquid crystal display device (display device) 10 and a backlight device (illumination device) 12 provided therein. Note that X, Y, and Z axes are depicted in part of each drawing, and the axial directions are drawn so as to correspond with the direction depicted in each drawing. Furthermore, in FIGS. 1 and 3, the upper side is the front side and the lower side is the rear side.

Figure 1:
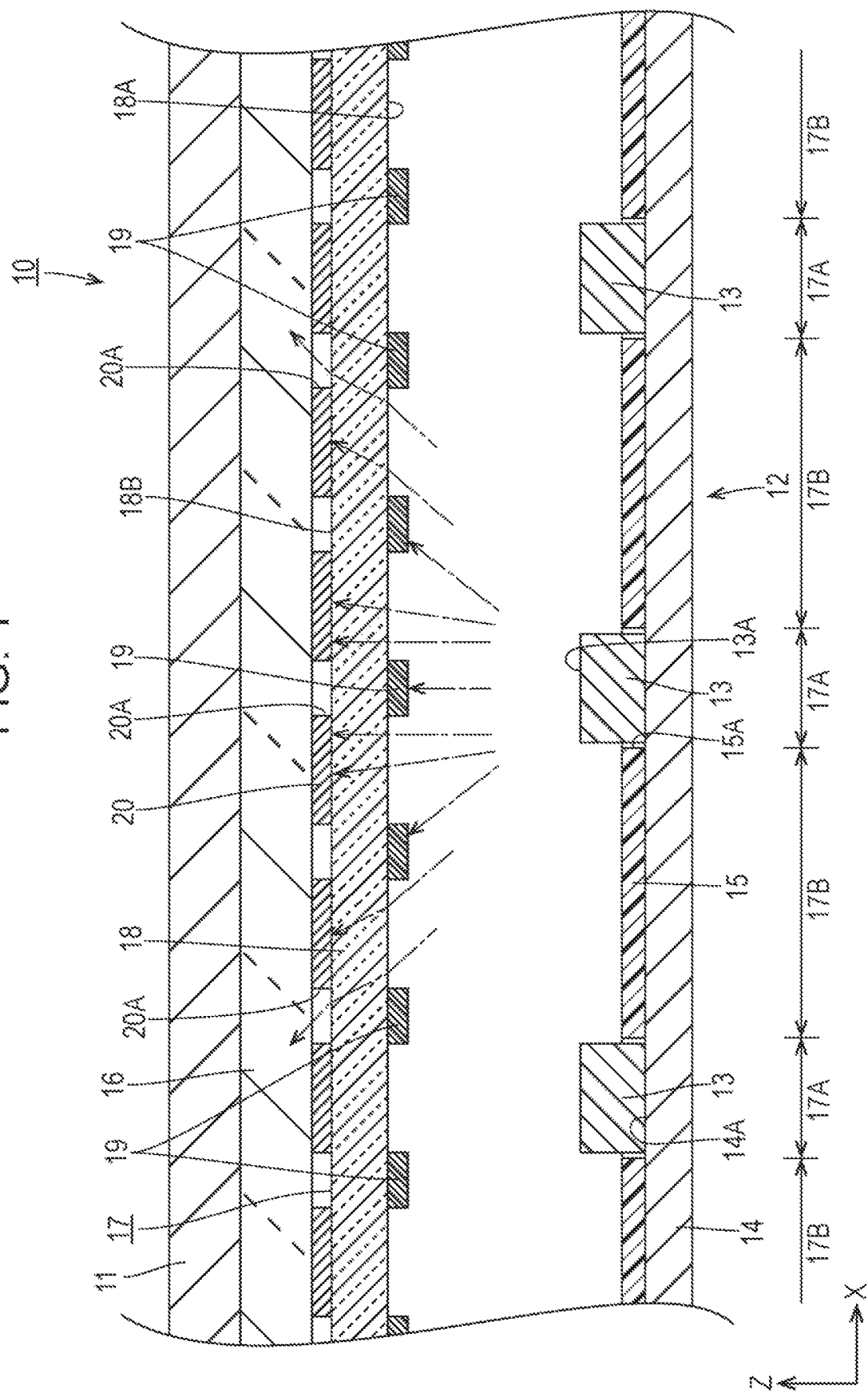
FIG. 1 is a cross-sectional view of a liquid crystal display device according to embodiment 1 of the present disclosure.

As depicted in FIG. 1, the liquid crystal display device 10 is provided with at least a liquid crystal panel (display panel) 11 that is capable of displaying images, and the backlight device 12, which is an external light source that is arranged at the rear side of the liquid crystal panel 11 and radiates display light toward the liquid crystal panel 11. Of these, the liquid crystal panel 11 has a configuration in which a pair of glass substrates are affixed together with a prescribed gap therebetween and liquid crystals are sealed between both glass substrates. One glass substrate (array substrate or active matrix substrate) is provided with switching elements (TFTs, for example) that are connected to mutually orthogonal source wiring and gate wiring, pixel electrodes that are connected to the switching elements, and an alignment film or the like. The other glass substrate (opposite substrate or CF substrate) is provided with color filters in which colored sections of R (red), G (green), and B (blue) or the like are arranged in a prescribed array, a black matrix that partitions the color filters, and an alignment film or the like. Note that polarizers are arranged at the outer side of both glass substrates. Furthermore, the liquid crystal panel 11 is depicted in a simplified manner in FIG. 1.

Next, the backlight device 12 will be described in detail. As depicted in FIG. 1, the backlight device 12 is provided with LEDs 13 that are light sources, an LED substrate (light source substrate) 14 on which the LEDs 13 are mounted, a reflection sheet 15 that is arranged so as to cover the front surface of the LED substrate 14 and reflects light, an optical sheet (optical member) 16 that is arranged at the front side (outgoing-light side) of the LEDs 13 with a gap therebetween, and a light-controlling sheet (light-controlling member) 17 arranged at the front side of the LEDs 13 with a gap therebetween and arranged so as to overlap the rear side of the optical sheet 16. In this way, in the backlight device 12 according to the present embodiment, the LEDs 13 are arranged in positions directly below the liquid crystal panel 11, adopting what is referred to as a direct-lit configuration. Note that the backlight device 12 is provided with a chassis that houses the LED substrate 14 and so forth, and a frame that holds the outer peripheral end sections of the optical sheet 16 and the light-controlling sheet 17, or the like (neither the chassis or the frame are depicted). It is preferable for the frame to be made of a synthetic resin (a polycarbonate, for example) that exhibits a white color having excellent light reflectivity. Hereinafter, each constituent component of the backlight device 12 will be described in detail.

As depicted in FIG. 1, a plurality of LEDs 13 (three in the present embodiment) are arranged side-by-side with gaps therebetween so as to form a line in the X axis direction in the surface of the LED substrate 14. The array pitches of the LEDs 13 are approximately 5 mm or less, for example. The LEDs 13 are what are referred to as top surface emitting types, which are surface-mounted on the LED substrate 14 with light-emitting surfaces 13A thereof facing away from the LED substrate 14. The LEDs 13 have a configuration in which LED chips (LED elements) constituting light-emitting sources are sealed within a case using a sealing material. It is assumed that the LED chips perform monochromatic emission of blue light, for example, with the LEDs 13 emitting white light as a whole due to phosphors (such as a yellow phosphor, a green phosphor, and a red phosphor) being dispersed and mixed within the sealing material. In the luminous intensity distribution of light emitted from these LEDs 13, there is a tendency for the light emission intensity to be highest in light that advances in the front direction of the LEDs 13, namely the normal direction (Z axis direction) to the surface (light-emitting surface 13A) of the LED substrate 14, and for the light emission intensity to decrease in a curved manner together with an increase in the angle formed with respect to the same normal direction. That is, the LEDs 13 have a Lambertian luminous intensity distribution. The optical axes of the LEDs 13 pass through the centers of the light-emitting surfaces 13A and are substantially parallel with the Z axis direction. The "optical axes" mentioned here are axes that coincide with the advancing direction of the light having the highest light emission intensity (forming a peak) out of the light emitted from the LEDs 13. Note that the light emitted from the LEDs 13 spreads in a substantially concentric circular shape about the optical axes in the X axis direction and the Y axis direction.

As depicted in FIG. 1, the led substrate 14 has a sheet form in which the front and rear pair of surfaces are parallel with the surfaces of the reflection sheet 15 and the light-controlling sheet 17. In the LED substrate 14, the surface at the front side opposes the surfaces of the reflection sheet 15 and the light-controlling sheet 17, and this is considered to be a mounting surface 14A on which the LEDs 13 are surface-mounted. On the mounting surface 14A of the LED substrate 14, a wiring pattern (not depicted) composed of a metal film such as copper foil is formed, and power is supplied to each LED 13 using the wiring pattern. Furthermore, on the mounting surface 14A of the LED substrate 14, it is preferable for a light-reflecting film (not depicted) that exhibits a white color to be formed in a shape covering the wiring pattern, thereby improving the light utilization efficiency. Note that the material used for the light-reflecting film is preferably a white resist made by Taiyo Holdings Co., Ltd. (product number: PSR-4000 or the like), for example, but this can be altered to something else as appropriate.

As depicted in FIG. 1, the reflection sheet 15 is laminated covering substantially the entire mounting surface 14A of the LED substrate 14 from the front side, and LED insertion holes 15A through which each LED 13 is individually passed are formed in positions overlapping each LED 13. The plurality of LED insertion holes 15A are arranged side-by-side with gaps therebetween in the X axis direction so as to be aligned with each LED 13 on the LED substrate 14. The entire reflection sheet 15 may be made of a synthetic resin and the front surface may exhibit a white color having excellent light reflectivity, or a silver color having excellent light reflectivity may be exhibited due to a metal such as silver being deposited on the front surface of a base material made of a synthetic resin such as PET.

As depicted in FIG. 1, the optical sheet 16 has a sheet form having surfaces that are parallel with the surfaces of the liquid crystal panel 11, the LED substrate 14, and so forth. The optical sheet 16 is arranged interposing the liquid crystal panel 11 and the light-controlling sheet 17 in the Z axis direction (the normal direction to the surfaces of the optical sheet 16 and the like). That is, it can be said that the optical sheet 16 is arranged at the exit of the outgoing-light path in the backlight device 12, and thereby has a function of causing light that has been emitted from the LEDs 13 and has passed through/exited from the light-controlling sheet 17 to exit toward the liquid crystal panel 11 while a prescribed optical action is applied thereto. The optical sheet 16 includes four sheets laminated to each other, which are a diffusing sheet, a first prism sheet, a second prism sheet, and a reflective polarizing sheet in this order from the rear side. Note that the optical sheet 16 is depicted in a simplified manner in FIG. 1. The diffusing sheet has a configuration in which a large number of diffusing particles for diffusing light are dispersed and mixed within a base material made of a synthetic resin that is substantially transparent. The first prism sheet and the second prism sheet have configurations in which a large number of unit prisms that extend in the X axis direction or the Y axis direction are arranged side-by-side in a direction (the Y axis direction or the X axis direction) that is orthogonal to the direction of extension on the surface of a base material made of a synthetic resin that is substantially transparent, and a light-concentrating action is selectively applied in the arrangement direction of the unit prisms to incoming light. The first prism sheet and the second prism sheet are arranged so that the light-concentrating directions are orthogonal to each other. The reflective polarizing sheet has a reflective polarizing film that polarizes and reflects light, and P-waves included in the light can be transmitted and S-waves can be reflected to the rear side by this reflective polarizing film. According to this reflective polarizing sheet, under normal circumstances, the S-waves, which are absorbed by a polarizer of the liquid crystal panel 11, are reflected to the rear side (the reflection sheet 15 side), and it is thereby possible for reuse thereof to be facilitated and luminance to be improved.

The light-controlling sheet 17 will be described in detail. As depicted in FIG. 1, the light-controlling sheet 17 is arranged at the exit side of the outgoing-light path in the backlight device 12 with respect to the LEDs 13. The light-controlling sheet 17 has a light-transmitting layer 18 that has a sheet form having surfaces that are parallel with the surfaces of the liquid crystal panel 11, the LED substrate 14, and so forth. The light-transmitting layer 18 is composed of a substantially transparent light-transmitting material (a material made of a synthetic resin such as acrylic or PET, for example), and transmits most incident light (visible light rays). The haze value according to the material for the light-transmitting layer 18 is preferably 30% or less. Out of the front and rear pair of surfaces of the light-transmitting layer 18, the rear-side surface opposing the light-emitting surfaces 13A of the LEDs 13 is considered to be an incoming-light surface 18A on which light is incident, whereas the front-side surface opposing the optical sheet 16 is considered to be an outgoing-light surface 18B from which light exits. Also, the light-controlling sheet 17 has first light-shielding sections 19 arranged at the rear side of the light-transmitting layer 18, namely at the LED 13 side, and a second light-shielding section 20 arranged at the front side of the light-transmitting layer 18, namely at the opposite side to the first light-shielding section 19 side. The first light-shielding sections 19 and the second light-shielding section 20 are both provided on the light-transmitting layer 18. Specifically, out of the pair of surfaces of the light-transmitting layer 18, the first light-shielding sections 19 are provided on the incoming-light surface 18A (the surface at the LED 13 side), and the second light-shielding section 20 is provided on the outgoing-light surface 18B (the surface at the opposite side to the LED 13 side). Consequently, the first light-shielding sections 19 and the second light-shielding section 20 are respectively arranged at the front side (the LED 13 side) and the rear side (the opposite side to the LED 13 side) with a gap having the thickness of the light-transmitting layer 18 therebetween in the light-controlling sheet 17.

The first light-shielding sections 19 and the second light-shielding section 20 are composed of a material in which the light-shielding rate is higher than the transmission rate, and are preferably both composed of the same material. The light-shielding rates of the first light-shielding sections 19 and the second light-shielding section 20 are higher than the light-shielding rate of the light-transmitting layer 18. Consequently, out of the light radiated toward the light-controlling sheet 17, most of the light that hits the first light-shielding sections 19 and the second light-shielding section 20 is blocked. The first light-shielding sections 19 and the second light-shielding section 20 are preferably composed of an ink that exhibits a white color having excellent light reflectivity. There is no restriction thereto, and the first light-shielding sections 19 and the second light-shielding section 20 may be composed of a metal material having excellent light reflectivity. Either way, in the first light-shielding sections 19 and the second light-shielding section 20, the light reflection rate is higher than the light absorption rate. Consequently, the light utilization efficiency is excellent compared to the case where the first light-shielding sections and the second light-shielding section are composed of an ink that exhibits a black color having an excellent light absorption rate. In the case where an ink is used as the material for the first light-shielding sections 19 and the second light-shielding section 20, when manufacturing is carried out, it is preferable for the first light-shielding sections 19 and the second light-shielding section 20 to be printed and formed on the surfaces of the light-transmitting layer 18 by means of an ink jet method. With the first light-shielding sections 19 and the second light-shielding section 20 being formed by means of an ink jet method, the lower limit of the array pitches is approximately 0.1 mm. Aside therefrom, the first light-shielding sections 19 and the second light-shielding section 20 may be printed and formed using another printing method such as a screen printing method. Either way, the first light-shielding sections 19 and the second light-shielding section 20 being printed and formed by means of a printing method is preferable for reducing manufacturing costs. Moreover, in the case where the first light-shielding sections 19 and the second light-shielding section 20 are composed of an ink that exhibits a white color, light can be diffused and reflected, and therefore the directivity of light can be mitigated, which is suitable for suppressing luminance irregularities. The ink material used for the first light-shielding sections 19 and the second light-shielding section 20 is preferably a white ink made by Taiyo Holdings Co., Ltd. (product number: IJR-4000 or the like), for example, but this can be altered to something else as appropriate. Meanwhile, in the case where the material for the first light-shielding sections 19 and the second light-shielding section 20 is a metal material, when manufacturing is carried out, it is preferable for the first light-shielding sections 19 and the second light-shielding section 20 to be patterned by means of a photolithography method. In a photolithography method, a photoresist is laminated on a metal film deposited on the surface of the light-transmitting layer 18, the photoresist is exposed through a photomask and then developed, and the photoresist is then subjected to patterning. The metal film is etched through the photoresist, and it is thereby possible to form the first light-shielding sections 19 and the second light-shielding section 20 composed of a metal film having a prescribed pattern. Compared to the printing method, with the photolithography method the first light-shielding sections 19 and the second light-shielding section 20 can be formed with a higher position accuracy, which is suitable for refining the pattern. With the first light-shielding sections 19 and the second light-shielding section 20 being formed by means of the photolithography method, there is a risk of a deterioration in properties due to the effect of diffraction when the array pitches are 1 µm or less, and therefore approximately 10 µm is preferable but there is not necessarily any restriction thereto. Moreover, in the case where the first light-shielding sections 19 and the second light-shielding section 20 are composed of a metal material, the light-shielding rate increases compared to when composed of an ink, and therefore it is unlikely that luminance irregularities will occur even if the gap in the Z axis direction between the LEDs 13 and the light-controlling sheet 17 is small, and this is suitable for increasing thinness. For example, silver, aluminum, an alloy including silver or aluminum, or the like can be used as the metal material used for the first light-shielding sections 19 and the second light-shielding section 20, but the material can also be altered to something else as appropriate.

Figure 2A:
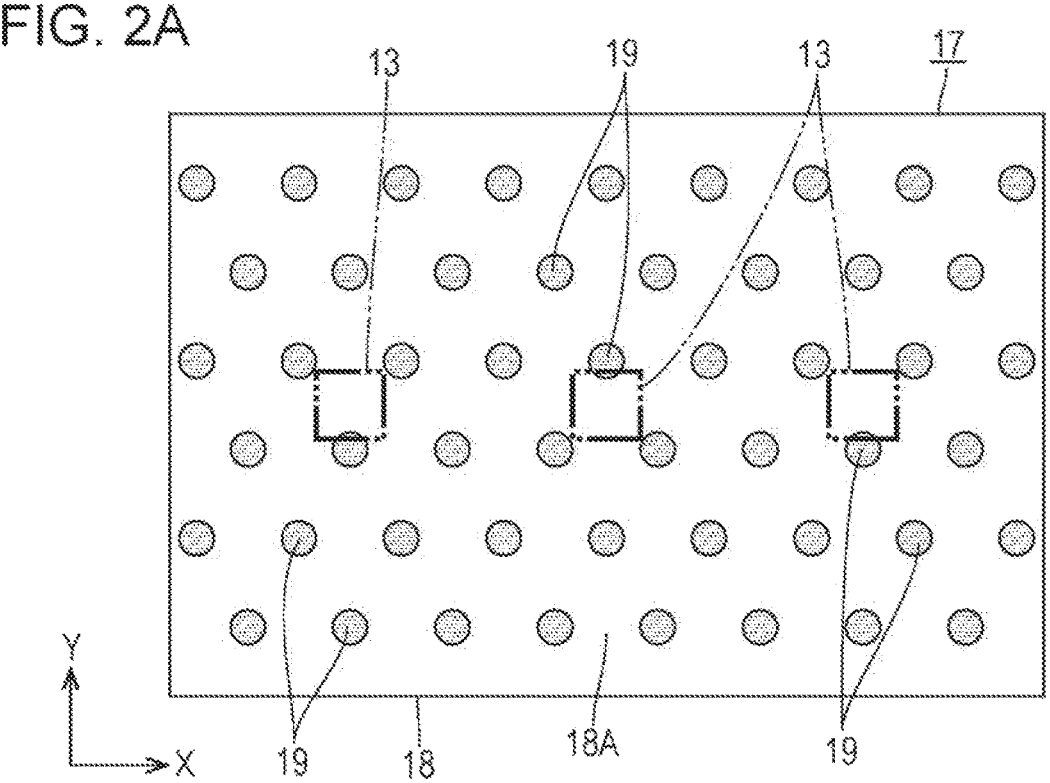
FIG. 2A is a bottom view of a light-controlling sheet.

Also, the first light-shielding sections 19 and the second light-shielding section 20 provided in the light-controlling sheet 17 are repeatedly arranged side-by-side in an alternating manner. A detailed planar arrangement of the first light-shielding sections 19 and the second light-shielding section 20 in the light-controlling sheet 17 will be described in detail using FIGS. 2A and 2B. Note that, in FIG. 2A, the first light-shielding sections 19 are depicted with a shaded form, and in FIG. 2B, the second light-shielding section 20 is depicted with a shaded form. Furthermore, in FIGS. 2A and 2B, the LEDs 13 are depicted using two-dot chain lines. As depicted in FIG. 2A, the first light-shielding sections 19 formed on the incoming-light surface 18A of the light-transmitting layer 18 have a dot form with a planar shape that is a perfect circle. A plurality of the first light-shielding sections 19 are arranged dispersed in a staggered form (zigzag form) on the incoming-light surface 18A of the light-transmitting layer 18. In detail, an arrangement is adopted in which a plurality of first light-shielding sections 19 arranged side-by-side with gaps therebetween in the X axis direction constitute one row, a plurality of these rows are arranged side-by-side with gaps therebetween in the Y axis direction, and rows that are adjacent in the Y axis direction deviate in the X axis direction. The amount of deviation in the X axis direction in the rows that are adjacent in the Y axis direction is approximately half the array pitches (array intervals) of the first light-shielding sections 19 in the X axis direction. Consequently, in intermediate positions between first light-shielding sections 19 that are adjacent in the X axis direction in a certain row, there are arranged the first light-shielding sections 19 included in adjacent rows. In the first light-shielding sections 19, the array pitches in the X axis direction and the array pitches in directions oblique to the X axis direction and the Y axis direction are substantially equal. Consequently, first light-shielding sections 19 that are adjacent in the X axis direction and first light-shielding sections 19 that are adjacent in directions oblique to the aforementioned first light-shielding sections 19 are arranged so as to be positioned at the vertexes of equilateral triangles. The plurality of first light-shielding sections 19 are arranged in a dispersed manner in such a way that as to have a uniform distribution in the surface of the light-transmitting layer 18. The array pitches of the first light-shielding sections 19 are less than the array pitches of the LEDs 13, and, specifically, are preferably less than or equal to ⅕ of the array pitches of the LEDs 13 (more specifically, less than or equal to 1 mm).

Figure 2B:
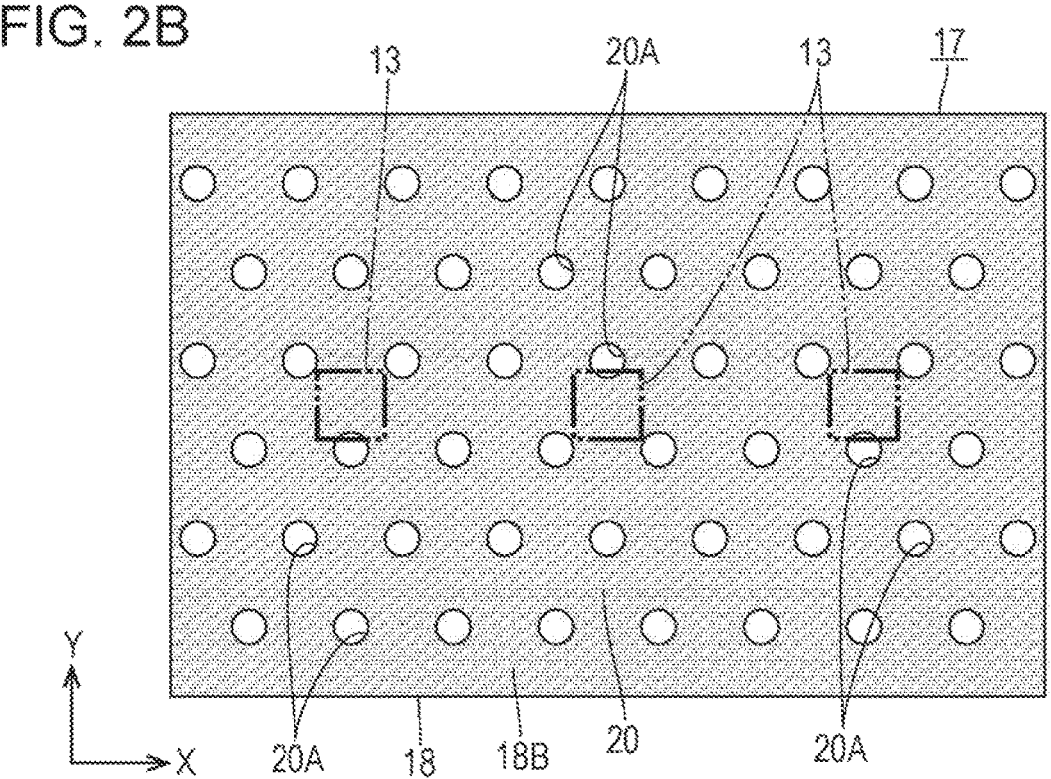
FIG. 2B is a plan view of the light-controlling sheet.

As depicted in FIG. 2B, the second light-shielding section 20 formed on the outgoing-light surface 18B of the light-transmitting layer 18 has a uniformly-planar form in which there are formed a plurality of dot-shaped openings 20A having a planar shape that is a perfect circle. These openings 20A have a positional relationship overlapping the first light-shielding sections 19 in plan view, and a plurality thereof are arranged in a dispersed manner in a staggered form similar to the first light-shielding sections 19. That is, it can be said that the second light-shielding section 20 is selectively arranged in portions in which the first light-shielding sections 19 are not arranged in plan view in the light-transmitting layer 18. Conversely, the first light-shielding sections 19 are selectively arranged in portions in which the second light-shielding section 20 is not arranged in plan view in the light-transmitting layer 18. In this way, it can also be said that the first light-shielding sections 19 and the second light-shielding section 20 have a mutually inverse arrangement, and are arranged so as to fill the surface of the light-transmitting layer 18 in a complementary manner. Thus, the surface of the light-controlling sheet 17 is divided into first light-shielding section arrangement regions in which the first light-shielding sections 19 are selectively arranged, and second light-shielding section arrangement regions in which the second light-shielding section 20 is selectively arranged. The area occupied by the second light-shielding section 20 on the surface of the light-transmitting layer 18 is greater than the area occupied by the first light-shielding sections 19. That is, the area occupied on the surface of the light-transmitting layer 18 by the first light-shielding sections 19 is less than 50%, whereas the area occupied on the surface of the light-transmitting layer 18 by the second light-shielding section 20 is greater than 50%. The second light-shielding section 20 has an arrangement that is the inverse of the first light-shielding sections 19 as previously mentioned, and is therefore arranged so as to have a uniform distribution in the surface of the light-transmitting layer 18. When straight lines passing through the center of each first light-shielding section 19 are drawn in the X axis direction, Y axis direction, and directions oblique thereto, an array is formed in which the first light-shielding sections 19 and the second light-shielding section 20 are repeatedly arranged side-by-side in an alternating manner along each straight line, as depicted in FIGS. 2A and 2B. The first light-shielding sections 19 and the second light-shielding section 20 arranged side-by-side in an alternating manner are arrayed regularly, and the array pitches (array intervals) thereof are substantially uniform across the entire region in the surface of the light-controlling sheet 17. Here, when the light-controlling sheet 17, in plan view, is divided into LED arrangement regions (light source arrangement regions) 17A in which the LEDs 13 are arranged and LED non-arrangement regions (light source non-arrangement regions) 17B in which the LEDs 13 are not arranged, the first light-shielding sections 19 and the second light-shielding section 20 are arranged so that the array pitches are equal between the LED arrangement regions 17A and the LED non-arrangement regions 17B. Thus, compared to the case where the array pitches between the first light-shielding sections and the second light-shielding section are varied between the LED arrangement regions 17A and the LED non-arrangement regions 17B, it becomes easy to manufacture the light-controlling sheet 17, and it is no longer necessary to consider the positional relationship with respect to the LEDs 13 when installing the light-controlling sheet 17.

The detailed relationship between the first light-shielding sections 19 and the second light-shielding section 20 will be described using FIG. 3. As depicted in FIG. 3, the first light-shielding sections 19 and the second light-shielding section 20 are arranged so that mutual boundary portions do not overlap. End surfaces 19A of the boundary portions of the first light-shielding sections 19 and end surfaces (openings 20A) of the boundary portions of the second light-shielding section 20 are arranged so as to be flush with each other. Here, when the refractive index according to the light-transmitting material in the light-transmitting layer 18 is taken as "n" and the critical angle in the light-transmitting layer 18 is taken as "θc", the critical angle θc is given by expression (1) below.

$$\theta c = \arcsin(1/n) \quad (1)$$

According to expression (1) given above, for example, in a case where the material for the light-transmitting layer 18 is acrylic, the refractive index n thereof is approximately 1.5, and therefore the critical angle θc of the light-transmitting layer 18 is approximately 41.8 degrees. In addition, when the thickness of the light-transmitting layer 18 is taken as "d" and the length of the first light-shielding sections 19 is taken as "p", the light-controlling sheet 17 is configured so that the length p of the first light-shielding sections 19 satisfies expression (2) below.

$$p = d * \tan \theta c \quad (2)$$

According to expression (2) given above, for example, in a case where the material for the light-transmitting layer 18 is acrylic, the value of tan θc is approximately 0.9, and therefore the length p of the first light-shielding sections 19 is less than the thickness d of the light-transmitting layer 18 at approximately 0.9 times thereof. In addition, according to expression (2) given above, as long as the critical angle θc of the light-transmitting layer 18 is less than 45 degrees, the length p of the first light-shielding sections 19 is less than the thickness d of the light-transmitting layer 18. Conversely, if the critical angle θc of the light-transmitting layer 18 is greater than 45 degrees, the length p of the first light-shielding sections 19 is greater than the thickness d of the light-transmitting layer 18. Moreover, in a case where the critical angle θc of the light-transmitting layer 18 is 45 degrees, the length p of the first light-shielding sections 19 is equal to the thickness d of the light-transmitting layer 18.

Due to the light-controlling sheet 17 having the aforementioned configuration, actions and effects such as the following can be obtained. First, out of the light emitted from the light-emitting surfaces 13A of the LEDs 13 and radiated toward the light-controlling sheet 17, the light that hits the first light-shielding sections 19 or the second light-shielding section 20, as depicted in FIG. 1, is blocked in the form of being mostly reflected by the first light-shielding sections 19 or the second light-shielding section 20 and is thereby unlikely to exit outside, whereas the light that does not hit the first light-shielding sections 19 or the second light-shielding section 20 passes through the light-transmitting layer 18 and is likely to exit outside. Here, the first light-shielding sections 19 and the second light-shielding section 20 are respectively arranged at the front side and the rear side with a gap having the thickness of the light-transmitting layer 18 therebetween in the light-controlling sheet 17. Therefore, out of the light emitted from the LEDs 13, if the angle of incidence is small, the light radiated toward portions of the light-transmitting layer 18 in which the first light-shielding sections 19 are not arranged and the second light-shielding section 20 is arranged has a high possibility of being blocked by the second light-shielding section 20 when passing through the light-transmitting layer 18. However, if the angle of incidence is large, there is an increase in the possibility of passing through the light-transmitting layer 18 while advancing obliquely, and exiting from portions in which the second light-shielding section 20 is not arranged. Note that the light emitted from the LEDs 13 and radiated toward portions of the light-transmitting layer 18 in which the first light-shielding sections 19 are arranged and the second light-shielding section 20 is not arranged is blocked by the first light-shielding sections 19. Furthermore, at interfaces of the light-transmitting layer 18, refraction of light occurs in accordance with the refractive index n of the light-transmitting layer 18.

Near the LEDs 13 in the surface of the light-transmitting layer 18 (light-controlling sheet 17), as depicted in FIG. 1 there is a lot of light that is incident from the LEDs 13 at angles close to vertical with respect to the surface of the light-transmitting layer 18, namely at small angles of incidence. Therefore, in portions in which the first light-shielding sections 19 are arranged, the light is reflected by the first light-shielding sections 19, and in portions in which the first light-shielding sections 19 are not arranged, the light passes through the light-transmitting layer 18 and then most of the light is reflected by the second light-shielding section 20. In either case, the light is mostly returned to the LED 13 side. Meanwhile, in the periphery of the LEDs 13 in the surface of the light-controlling sheet 17, compared to the light that is incident from the LEDs 13 at angles close to vertical with respect to the surface of the light-transmitting layer 18, there is more light that is incident at large angles of incidence. Therefore, in portions in which the first light-shielding sections 19 are arranged, the light is reflected by the first light-shielding sections 19, but in portions in which the first light-shielding sections 19 are not arranged, there is a possibility of the light passing through the light-transmitting layer 18 and exiting from portions in which the second light-shielding section 20 is not arranged, and there is a tendency for the possibility of the light exiting to increase as the angle of incidence increases. Also, there is a tendency for the angle of incidence of light that is incident on the light-transmitting layer 18 to increase as the distance from an LED 13 increases in the surface of the light-transmitting layer 18. Consequently, regardless of the positional relationship of portions in which the first light-shielding sections 19 are arranged and portions in which the second light-shielding section 20 is arranged, of the light-transmitting layer 18, with respect to the LEDs 13, in the vicinity of the LEDs 13 where there is a large amount of light, the exiting of light is suppressed, and in the periphery of the LEDs 13 where there is a small amount of light, the exiting of light is facilitated for the amount of outgoing light to be made uniform. That is, it is possible for luminance irregularities to be suitably suppressed without having to align the LEDs 13 and the light-controlling sheet 17 in a precise manner. Thus, there is an improvement in the productivity attained when the backlight device 12 is manufactured, and there is an improvement in display quality for images displayed on the liquid crystal display device 10.

Here, the light that is emitted from the LEDs 13 and directly hits the surface at the rear side in the first light-shielding sections 19, as depicted in FIG. 1, is thereby diffused and reflected and most of the light is returned to the LED 13 side and thereafter once again reflected by the reflection sheet 15. Therefore, some of the light passes through the light-transmitting layer 18 and is used as outgoing light, whereas the remaining light is not used as outgoing light. In comparison, a large amount of the light that is diffused and reflected by the second light-shielding section 20 is, in the process of being returned to the LED 13 side, once again diffused and reflected at the surface at the front side in the first light-shielding sections 19 and exits outside, and the possibility of being used as outgoing light is high. In the present embodiment, as depicted in FIGS. 2A and 2B, the area occupied by the second light-shielding section 20 is larger than the area occupied by the first light-shielding sections 19, and therefore, compared to the case where the occupied areas have the reverse relationship, the amount of light diffused and reflected by the second light-shielding section 20 and then used as outgoing light increases. Thus, the light utilization efficiency further increases, which is more suitable for improving luminance.

Next, the setting of the length p of the first light-shielding sections 19 will be described in detail. First, light having an angle of incidence with respect to the light-transmitting layer 18 that does not exceed the critical angle θc, as depicted in FIG. 3, exits outside without being totally reflected at an interface of the outgoing-light surface 18B of the light-transmitting layer 18, whereas light having an angle of incidence with respect to the light-transmitting layer 18 that exceeds the critical angle θc is totally reflected at an interface of the outgoing-light surface 18B of the light-transmitting layer 18 and is returned to the LED 13 side. Here, in a case where the length p of the first light-shielding sections 19 is less than "d*tan θc" (when "p<d"), a portion of light which has an angle of incidence with respect to the light-transmitting layer 18 that does not exceed the critical angle θc and which would normally exit hits the second light-shielding section 20 and is thereby blocked, and the amount of outgoing light consequently decreases. Meanwhile, in a case where the length p of the first light-shielding sections 19 is greater than "d*tan θc" (when "p>d") in contrast to the aforementioned, a portion of light having an angle of incidence with respect to the light-transmitting layer 18 that exceeds the critical angle θc is totally reflected at interfaces in portions of the light-transmitting layer 18 in which the second light-shielding section 20 is not arranged and is returned to the LED 13 side. In addition, the area ratio of the first light-shielding sections 19 occupied in the light-transmitting layer 18 increases and therefore the amount of light blocked by the first light-shielding sections 19 increases, and as a result the amount of outgoing light decreases. In response, by adopting a configuration for the light-controlling sheet 17 so that the length p of the first light-shielding sections 19 is equal to "d*tan θc", it is possible to avoid the light blocked by the second light-shielding section 20 becoming excessive, it is possible avoid light being totally reflected at interfaces in portions of the light-transmitting layer 18 in which the second light-shielding section 20 is not arranged, and it is also possible to avoid the area ratio of the first light-shielding sections 19 occupied in the light-transmitting layer 18 becoming excessive. According to the above, the amount of outgoing light from the light-controlling sheet 17 can be sufficiently ensured. Moreover, since the first light-shielding sections 19 are formed to have a planar shape that is a perfect circle, the length p of the first light-shielding sections 19 is uniform in all directions. Consequently, regardless of the direction from which light is incident on portions of the light-transmitting layer 18 in which the first light-shielding sections 19 are not arranged, it is possible to avoid the light blocked by the second light-shielding section 20 becoming excessive, it is possible avoid light being totally reflected at interfaces in portions of the light-transmitting layer 18 in which the second light-shielding section 20 is not arranged, and it is also possible to avoid the area ratio of the first light-shielding sections 19 occupied in the light-transmitting layer 18 becoming excessive. It is thereby possible to ensure a greater amount of outgoing light from the light-controlling sheet 17.

As described above, the backlight device (illumination device) 12 of the present embodiment is provided with LEDs (light sources) 13 and a light-controlling sheet (light-controlling member) 17 that is arranged at the exit side of the outgoing-light path of the LEDs 13. The light-controlling sheet 17 has a light-transmitting layer 18 that transmits light, first light-shielding sections 19 that are arranged at the LED 13 side of the light-transmitting layer 18, and a second light-shielding section 20 that is arranged at the opposite side to the first light-shielding section 19 side of the light-transmitting layer 18. The first light-shielding sections 19 and the second light-shielding section 20 are repeatedly arranged side-by-side in an alternating manner.

With this configuration, the exiting outside of light emitted from the LEDs 13 is controlled using the light-controlling sheet 17 arranged at the exit side of the outgoing-light path of the LEDs 13. Out of the light radiated toward the light-controlling sheet 17, the light that hits the first light-shielding sections 19 or the second light-shielding section 20 is unlikely to exit outside due to being blocked by the first light-shielding sections 19 or the second light-shielding section 20, whereas the light that does not hit the first light-shielding sections 19 or the second light-shielding section 20 passes through the light-transmitting layer 18 and is likely to exit outside. Since the first light-shielding sections 19 and the second light-shielding section 20 are arranged so as to be repeatedly arranged side-by-side in an alternating manner in the light-controlling sheet 17, the second light-shielding section 20 is arranged in portions of the light-transmitting layer 18 in which the first light-shielding sections 19 are not arranged, whereas the first light-shielding sections 19 are arranged in portions of the light-transmitting layer 18 in which the second light-shielding section 20 is not arranged. Here, the first light-shielding sections 19 and the second light-shielding section 20 are respectively arranged at the LED 13 side and the opposite side thereto with a gap having the thickness of the light-transmitting layer 18 therebetween in the light-controlling sheet 17. Therefore, if the angle of incidence is small, the light emitted from the LEDs 13 and radiated toward portions of the light-transmitting layer 18 in which the first light-shielding sections 19 are not arranged has a high possibility of being blocked by the second light-shielding section 20 when passing through the light-transmitting layer 18. However, if the angle of incidence is large, there is an increase in the possibility of passing through the light-transmitting layer 18 while advancing obliquely, and exiting from portions in which the second light-shielding section 20 is not arranged. Note that the light emitted from the LEDs 13 and radiated toward portions of the light-transmitting layer 18 in which the second light-shielding section 20 is not arranged is blocked by the first light-shielding sections 19. Also, near the LEDs 13, since there is a lot of light that is incident at a small angle of incidence with respect to the light-controlling sheet 17, a large amount of light is blocked by the first light-shielding sections 19 and the second light-shielding section 20, whereas, in the periphery of the LEDs 13, the angle of incidence of light that is incident on the light-controlling sheet 17 increases as the distance from the LEDs 13 increases, and there is a tendency for the amount of light that exits the light-controlling sheet 17 to increase without being blocked by the first light-shielding sections 19 or the second light-shielding section 20. Consequently, regardless of the positional relationship of portions in which the first light-shielding sections 19 are arranged and portions in which the second light-shielding section 20 is arranged, of the light-transmitting layer 18, with respect to the LEDs 13, in the vicinity of the LEDs 13 where there is a large amount of light, the exiting of light is suppressed, and in the periphery of the LEDs 13 where there is a small amount of light, the exiting of light is facilitated for the amount of outgoing light to be made uniform. That is, it is possible for luminance irregularities to be suitably suppressed without aligning the LEDs 13 and the light-controlling sheet 17 in a precise manner. In this way, the optical function of the light-controlling sheet 17 is sufficiently exhibited even if the LEDs 13 and the light-controlling sheet 17 do not have a specific positional relationship, and therefore, even in a case where, for example, thermal expansion or thermal contraction occurs in the light-controlling sheet 17 due to changes in the thermal environment and accordingly the positional relationship of the light-shielding sections 19 and 20 with respect to the LEDs 13 changes, the optical function of the light-controlling sheet 17 is not impaired and luminance irregularities are suitably suppressed.

Furthermore, the light-transmitting layer 18 is composed of a light-transmitting material that transmits light. With this configuration, the gap between the first light-shielding sections 19 and the second light-shielding section 20 can be maintained in a fixed manner by the light-transmitting layer 18, and therefore the positional relationship between the first light-shielding sections 19 and the second light-shielding section 20 can be maintained in a stable manner compared to the case where the light-transmitting layer is implemented as an air layer. It is thereby possible to appropriately control, in accordance with the angle of incidence with respect to the light-transmitting layer 18, whether light emitted from the LEDs 13 is blocked by the second light-shielding section 20 or exits without being blocked, after being incident on portions in the light-transmitting layer 18 in which the first light-shielding sections 19 are not arranged and advancing obliquely.

Furthermore, when the thickness of the light-transmitting layer 18 is taken as d, the critical angle based on the refractive index according to the light-transmitting material in the light-transmitting layer 18 is taken as θc, and the length of the first light-shielding sections 19 is taken as p, the light-controlling sheet 17 is configured so as to satisfy the aforementioned expression (2).

First, light having an angle of incidence with respect to the light-transmitting layer 18 that does not exceed the critical angle θc exits outside without being totally reflected at an interface of the light-transmitting layer 18, whereas light having an angle of incidence with respect to the light-transmitting layer 18 that exceeds the critical angle θc is totally reflected at an interface of the light-transmitting layer 18 and is returned to the LED 13 side. Here, in a case where the length p of the first light-shielding sections 19 is less than "d*tan θc", a portion of light having an angle of incidence with respect to the light-transmitting layer 18 that does not exceed the critical angle θc hits the second light-shielding section 20 and is thereby blocked, and the amount of outgoing light consequently decreases. Meanwhile, in a case where the length p of the first light-shielding sections 19 is greater than "d*tan θc" in contrast to the aforementioned, a portion of light having an angle of incidence with respect to the light-transmitting layer 18 that exceeds the critical angle θc is totally reflected at interfaces in portions of the light-transmitting layer 18 in which the second light-shielding section 20 is not arranged and is returned to the LED 13 side, and in addition the area ratio of the first light-shielding sections 19 occupied in the light-transmitting layer 18 increases and therefore the amount of light blocked by the first light-shielding sections 19 increases, and as a result the amount of outgoing light decreases. In response, due to the light-controlling sheet 17 being configured so that the aforementioned expression (2) is satisfied, it is possible to avoid the light blocked by the second light-shielding section 20 becoming excessive, it is possible avoid light being totally reflected at interfaces in portions of the light-transmitting layer 18 in which the second light-shielding section 20 is not arranged, and it is also possible to avoid the area ratio of the first light-shielding sections 19 occupied in the light-transmitting layer 18 becoming excessive. According to the above, the amount of outgoing light from the light-controlling sheet 17 can be sufficiently ensured.

Furthermore, the first light-shielding sections 19 are formed to have a planar shape that is a perfect circle. With this configuration, the length p of the first light-shielding sections 19 is uniform in all directions. Consequently, regardless of the direction from which light is incident on portions of the light-transmitting layer 18 in which the first light-shielding sections 19 are not arranged, it is possible to avoid the light blocked by the second light-shielding section 20 becoming excessive, it is possible avoid light being totally reflected at interfaces in portions of the light-transmitting layer 18 in which the second light-shielding section 20 is not arranged, and it is also possible to avoid the area ratio of the first light-shielding sections 19 occupied in the light-transmitting layer 18 becoming excessive. It is thereby possible to ensure a greater amount of outgoing light from the light-controlling sheet 17.

Furthermore, out of the pair of surfaces 18A and 18B in the light-transmitting layer 18, the first light-shielding sections 19 are provided on the incoming-light surface 18A, which is the surface at the LED 13 side, and the second light-shielding section 20 is provided on the outgoing-light surface 18B, which is the surface at the opposite side to the LED 13 side. With this configuration, the number of components is reduced compared to the case where either one of the first light-shielding sections 19 and the second light-shielding section 20 is provided in a member separate from the light-transmitting layer 18.

Furthermore, in the first light-shielding sections 19 and the second light-shielding section 20, the light reflection rate is higher than the light absorption rate. With this configuration, compared to the case where the light absorption rate is higher than the light reflection rate, a greater amount of light reflected by the first light-shielding sections 19 and the second light-shielding section 20 can be used as outgoing light, and therefore the light utilization efficiency increases, which is suitable for improving luminance.

Furthermore, the area occupied by the second light-shielding section 20 is larger than the area occupied by the first light-shielding sections 19. The light reflected by the first light-shielding sections 19 is returned to the LED 13 side as it is, and therefore the possibility of being used as outgoing light is low. In comparison, in some cases the light reflected by the second light-shielding section 20 is, in the process of being returned to the LED 13 side, reflected by the first light-shielding sections 19 and exits outside, and therefore the possibility of being used as outgoing light is high. Due to the area occupied by the second light-shielding section 20 being larger than the area occupied by the first light-shielding sections 19, the light utilization efficiency further increases, which is more suitable for improving luminance.

Furthermore, the light-controlling sheet 17, in plan view, is divided into LED arrangement regions (light source arrangement regions) 17A in which the LEDs 13 are arranged and LED non-arrangement regions (light source non-arrangement regions) 17B in which the LEDs 13 are not arranged, and the first light-shielding sections 19 and the second light-shielding section 20 are arranged so that the array intervals are equal between the LED arrangement regions 17A and the LED non-arrangement regions 17B. With this configuration, it becomes easy to manufacture the light-controlling sheet 17 compared to the case where the array intervals between the first light-shielding sections and the second light-shielding section 20 are varied between the LED arrangement regions 17A and the LED non-arrangement regions 17B. Note that, even if the array intervals between the first light-shielding sections 19 and the second light-shielding section 20 are equal between the LED arrangement regions 17A and the LED non-arrangement regions 17B as described above, the light-controlling function of the first light-shielding sections 19 and the second light-shielding section 20 is appropriately exhibited and luminance irregularities are suitably suppressed.

Furthermore, the liquid crystal display device 10 according to the present embodiment is provided with the backlight device 12 described above and the liquid crystal panel (display panel) 11 which displays images using light radiated from the backlight device 12. According to this kind of liquid crystal display device 10, luminance irregularities are unlikely to occur in the outgoing light from the backlight device 12, and therefore excellent display quality can be obtained.

Embodiment 2

Embodiment 2 of the present disclosure will be described using FIG. 4. In embodiment 2, the configuration of first light-shielding sections 119 and a second light-shielding section 120 have been altered. Note that duplicate descriptions of structures, actions, and effects similar to those of the aforementioned embodiment 1 are omitted.

Figure 4:
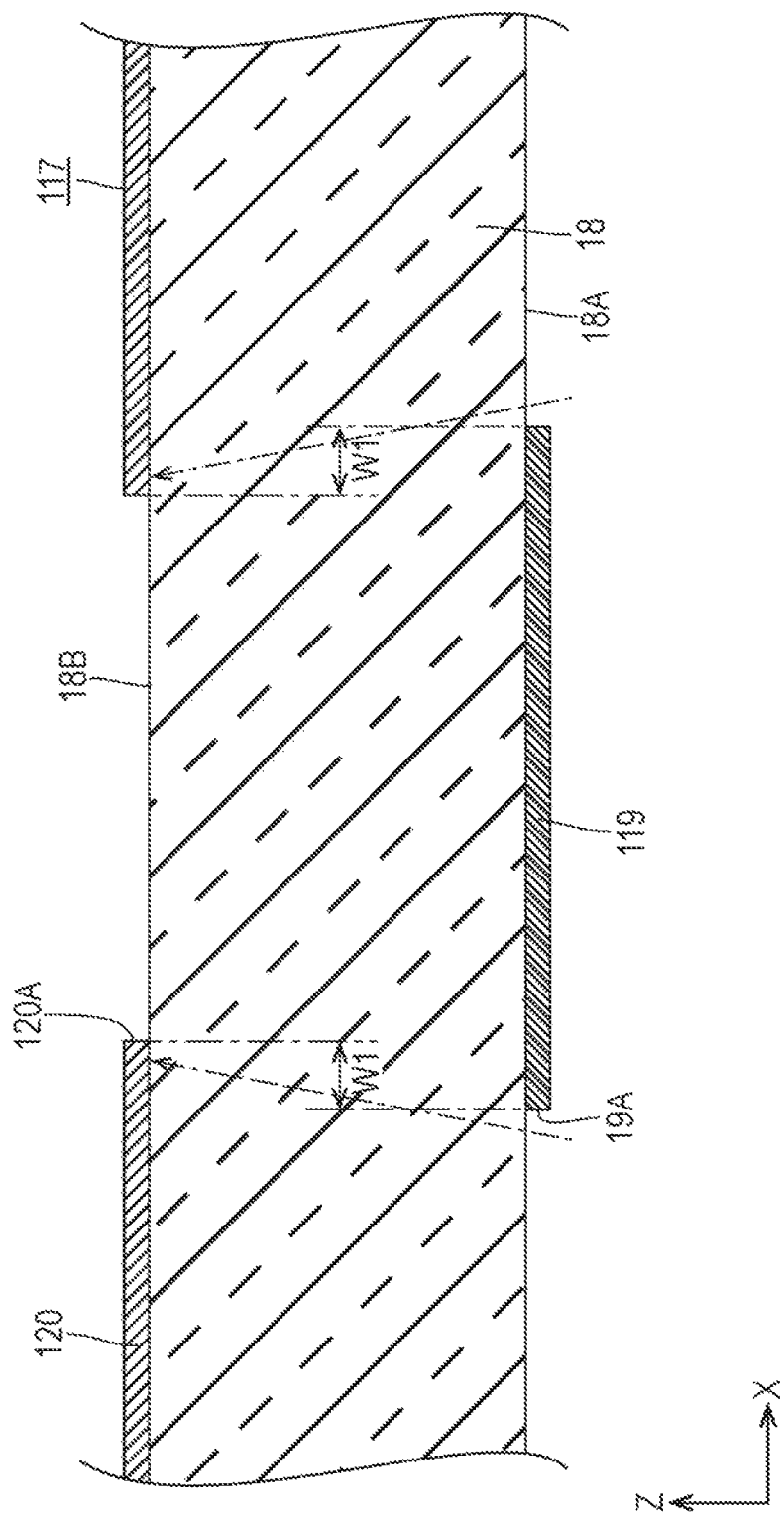
FIG. 4 is an enlarged cross-sectional view of a light-controlling sheet according to embodiment 2 of the present disclosure.

As depicted in FIG. 4, the first light-shielding sections 119 and the second light-shielding section 120 according to the present embodiment are arranged so that boundary portions thereof overlap. In detail, the first light-shielding sections 119 have a planar shape that is a perfect circle, and the outer peripheral end sections thereof are arranged so as to, in plan view, overlap across the whole circumference with the opening edge sections of openings 120A in the second light-shielding section 120. The overlapping portions of the first light-shielding sections 119 and the second light-shielding section 120 have an annular shape (donut shape) in plan view, and the overlapping width W1 thereof is substantially uniform across the whole circumference. The surface of this light-controlling sheet 117 is divided into light-shielding section joint regions in which the first light-shielding sections 119 and the second light-shielding section 120 are both arranged, in addition to the first light-shielding section arrangement regions and the second light-shielding section arrangement regions described in the aforementioned embodiment 1. According to the present embodiment, out of the light radiated toward portions of the light-controlling sheet 117 in which the first light-shielding sections 119 are not arranged, there is an increase in the possibility of light having an angle of incidence that is approximately slightly larger than 0 degrees being blocked by the overlapping portions (light-shielding section joint regions) of the first light-shielding sections 119 and the second light-shielding section 120. Consequently, even if there is a lot of light having a small angle of incidence with respect to the light-controlling sheet 117 in the vicinity of the LEDs, which are not depicted, that light is efficiently blocked by the overlapping portions of the first light-shielding sections 119 and the second light-shielding section 120, and it is therefore unlikely that a local bright section will be visible in the vicinity of the LEDs. Thus, the occurrence of luminance irregularities is more suitably suppressed.

According to the present embodiment as described above, the first light-shielding sections 119 and the second light-shielding section 120 are arranged so that boundary portions thereof overlap. With this configuration, a greater amount of light having a small angle of incidence with respect to the light-controlling sheet 117 can be blocked compared to the case where an arrangement is adopted in which the boundary portions of the first light-shielding sections and the second light-shielding section do not overlap. In particular, even though a large amount of light having a small angle of incidence is radiated toward the first light-shielding sections 119 and the second light-shielding section 120 arranged in the vicinity of the LEDs, a large amount of that light can be blocked by the overlapping boundary portions of the first light-shielding sections 119 and the second light-shielding section 120, and therefore the exiting of light from the vicinity of the LEDs is suppressed and it is unlikely that a local bright section will be visible. Furthermore, since the boundary portions overlap, even if a slight positional deviation occurs when the first light-shielding sections 119 and the second light-shielding section 120 are formed, the light in the vicinity of the LEDs can be blocked, and it is thereby unlikely that a local bright section will be visible.

Embodiment 3

Embodiment 3 of the present disclosure will be described using FIG. 5. In embodiment 3, the configuration of a light-controlling sheet 217 and so forth has been altered from the aforementioned embodiment 1. Note that duplicate descriptions of structures, actions, and effects similar to those of the aforementioned embodiment 1 are omitted.

Figure 5:
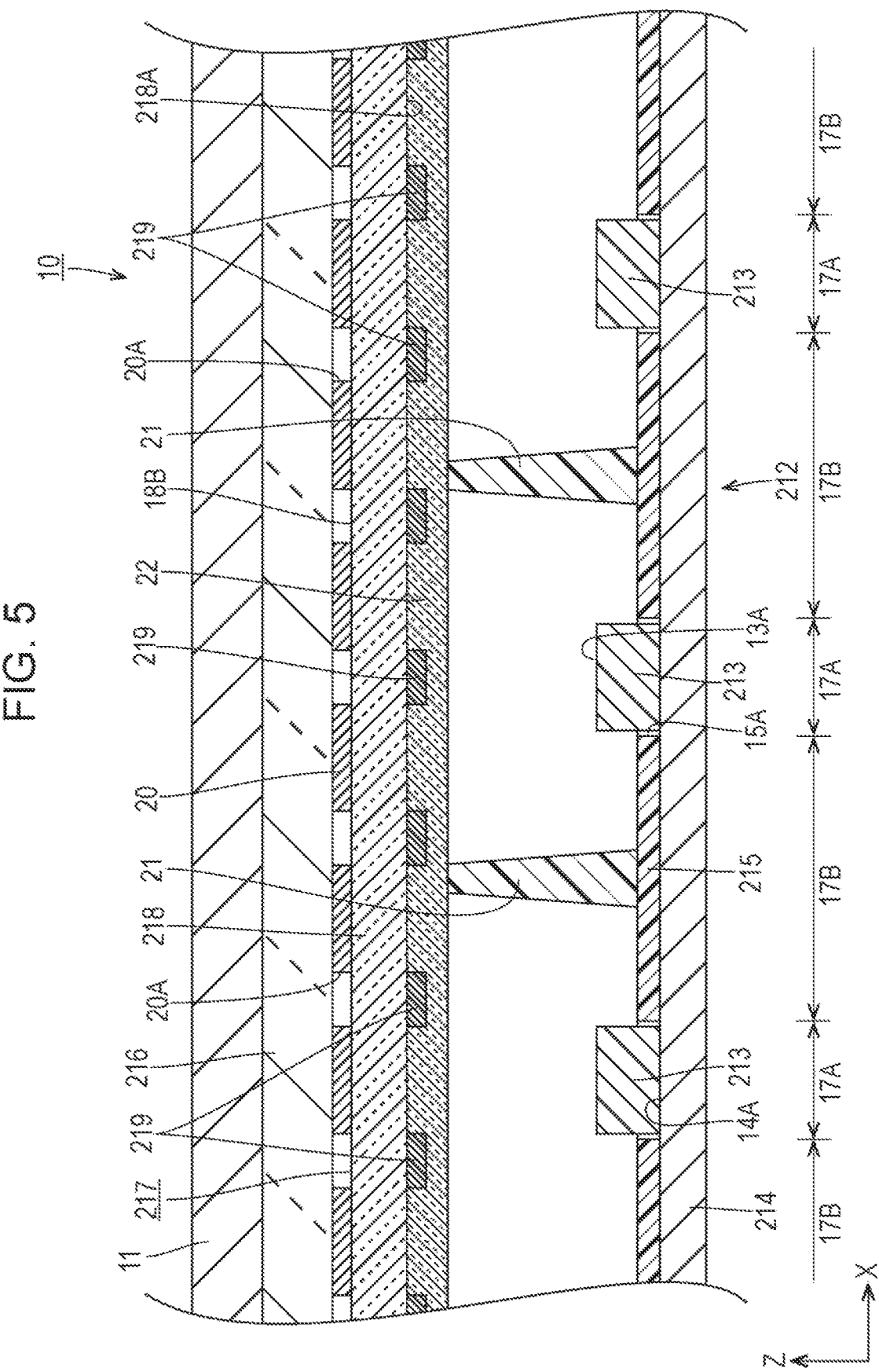
FIG. 5 is a cross-sectional view of a liquid crystal display device according to embodiment 3 of the present disclosure.

As depicted in FIG. 5, a backlight device 212 according to the present embodiment is provided with support members 21 that support the light-controlling sheet 217 and an optical sheet 216 from the rear side (LED 213 side). The support members 21 are arranged interposing an LED substrate 214 (reflection sheet 215) and the light-controlling sheet 217 in the Z axis direction, and have a columnar shape that tapers from the LED substrate 214 side toward the light-controlling sheet 217. The support members 21 are made of a synthetic resin that exhibits a white color having excellent light reflectivity similar to the reflection sheet 215. Furthermore, the support members 21 are arranged in substantially intermediate positions between adjacent LEDs 213. Due to the light-controlling sheet 217 and the optical sheet 216 being supported from the rear side by the support members 21, deforming such as bending is suppressed. In contrast, the light-controlling sheet 217 is provided with a protective layer 22 that is laminated and formed so as to overlap a light-transmitting layer 218 at the LED 213 side with first light-shielding sections 219 interposed. The protective layer 22 is composed of a substantially transparent light-transmitting material similar to the light-transmitting layer 218. It is preferable for the protective layer 22 to be the same material as the light-transmitting layer 218 or a material having the same refractive index for it to be possible to avoid the refraction of light occurring at interfaces. However, it is also possible for the protective layer 22 and the light-transmitting layer 218 to be configured of materials having different refractive indexes, and in this case it is preferable for the haze value according to the material for the protective layer 22 to be 30% or less. The protective layer 22 is provided in a uniformly-planar form so as to cover an incoming-light surface 218A of the light-transmitting layer 218 and to cover the first light-shielding sections 219. Also, out of the light-controlling sheet 217, the support members 21 are implemented so as to abut the protective layer 22, and problems are unlikely to occur such as the support members 21 interfering with the first light-shielding sections 219 by rubbing thereagainst and causing the first light-shielding sections 219 to detach. Thus, the light-controlling function of the first light-shielding sections 219 can be appropriately exhibited.

According to the present embodiment as described above, the first light-shielding sections 219 are provided on the surface at the LED 213 side of the light-transmitting layer 218, and there are provided: the protective layer 22 that is laminated and formed so as to overlap the LED 213 side of the light-transmitting layer 218 with the first light-shielding sections 219 interposed; and the support members 21 that are arranged at the LED 213 side of the light-controlling sheet 217, abut the protective layer 22, and support the light-controlling sheet 217. With this configuration, the light-controlling sheet 217 is supported by the support members 21 arranged at the LED 213 side, and deforming such as bending is thereby suppressed. Out of the light-controlling sheet 217, the support members 21 abut the protective layer 22 that is laminated and formed so as to overlap the light-transmitting layer 218 at the LED 213 side with the first light-shielding sections 219 interposed, and therefore problems are unlikely to occur such as the support members 21 interfering with the first light-shielding sections 219 and causing the first light-shielding sections 219 to detach. Thus, the light-controlling function of the first light-shielding sections 219 can be appropriately exhibited.

Embodiment 4

Embodiment 4 of the present disclosure will be described using FIG. 6. In embodiment 4, the configuration of a light-controlling sheet 317 has been altered from the aforementioned embodiment 1. Note that duplicate descriptions of structures, actions, and effects similar to those of the aforementioned embodiment 1 are omitted.

Figure 6:
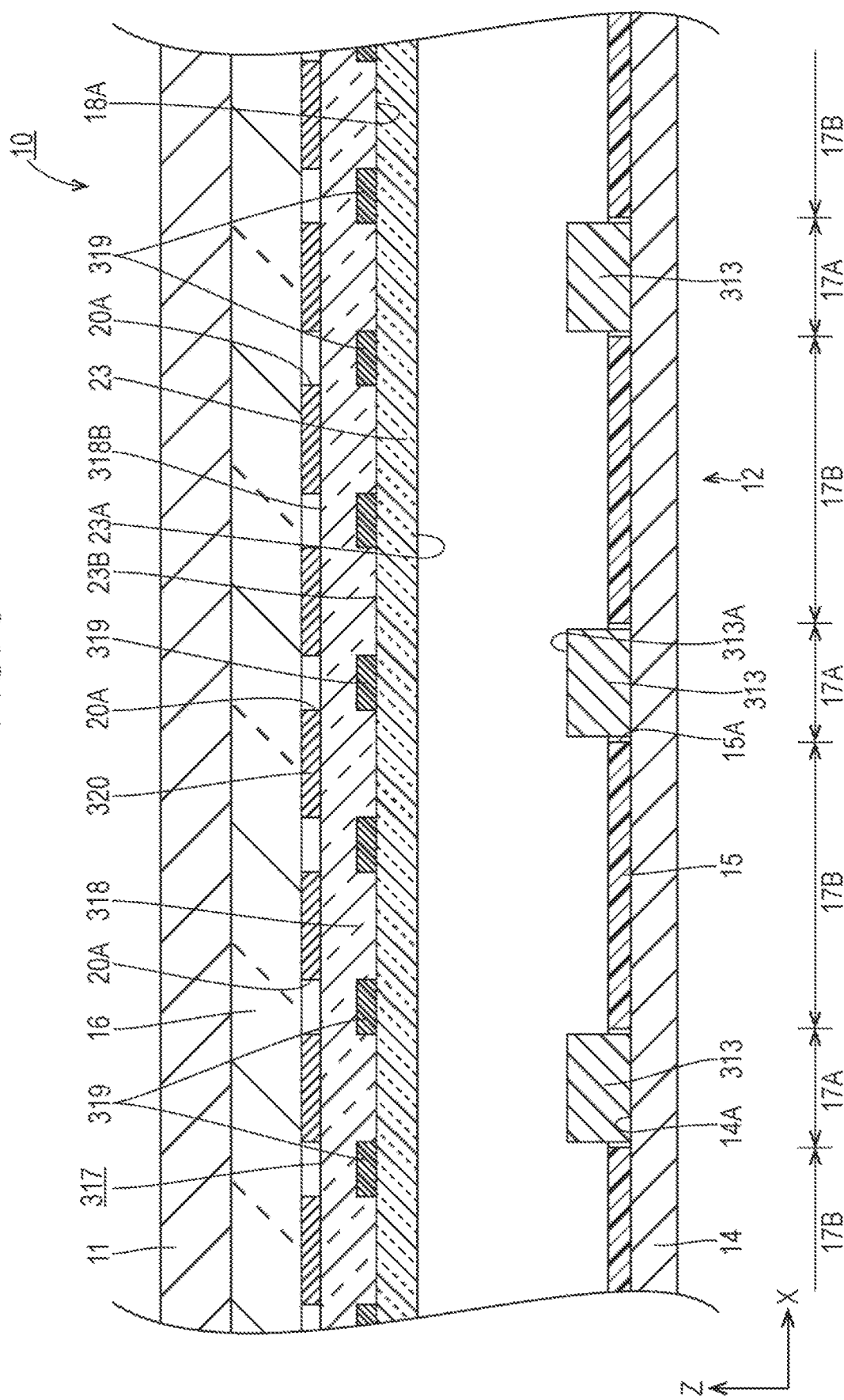
FIG. 6 is a cross-sectional view of a liquid crystal display device according to embodiment 4 of the present disclosure.

As depicted in FIG. 6, the light-controlling sheet 317 according to the present embodiment is provided with a second light-transmitting layer 23 arranged so as to overlap the rear side of a light-transmitting layer 318. The second light-transmitting layer 23 is composed of a substantially transparent light-transmitting material similar to the light-transmitting layer 318. It is preferable for the second light-transmitting layer 23 to be the same material as the light-transmitting layer 318 or a material having the same refractive index for it to be possible to avoid the refraction of light occurring at interfaces. However, it is also possible for the second light-transmitting layer 23 and the light-transmitting layer 318 to be configured of materials having different refractive indexes, and in this case it is preferable for the haze value according to the material for the second light-transmitting layer 23 to be 30% or less. Out of the front and rear pair of surfaces of the second light-transmitting layer 23, the rear-side surface opposing the light-emitting surfaces 13A of the LEDs 13 is considered to be an incoming-light surface 23A on which light is incident, whereas the front-side surface opposing the light-transmitting layer 318 is considered to be an outgoing-light surface 23B from which light exits. First light-shielding sections 319 and a second light-shielding section 320 are provided, the first light-shielding sections 319 being provided on the outgoing-light surface 23B of the second light-transmitting layer 23, and the second light-shielding section 320 being provided on an outgoing-light surface 318B of the light-transmitting layer 318. Consequently, in the present embodiment, when the light-controlling sheet 317 is manufactured, it is sufficient for the second light-shielding section 320 and the first light-shielding sections 319 to be continuously provided on the outgoing-light surface 318B of the light-transmitting layer 318 and the incoming-light surface 23A of the second light-transmitting layer 23 respectively, and arranged so as to overlap the light-transmitting layer 318 and the second light-transmitting layer 23. Consequently, it is unlikely that deviation will occur in the positional relationship between the first light-shielding sections 319 and the second light-shielding section 320 compared to the case where, as in the aforementioned embodiment 1, the first light-shielding sections 19 are provided on the incoming-light surface 18A of the light-transmitting layer 18 and then the light-transmitting layer 18 is inverted for the second light-shielding section 20 to be provided on the outgoing-light surface 18B (see FIG. 1). Moreover, the second light-transmitting layer 23 is arranged at the side nearest the LEDs 313 in the light-controlling sheet 317, and therefore, in a case where, for example, the support members 21 (see FIG. 5) described in the aforementioned embodiment 3 are provided, due to those support members 21 abutting the second light-transmitting layer 23, it is possible to avoid the support members 21 interfering with the first light-shielding sections 319.

According to the present embodiment described above, one out of the first light-shielding sections 319 and the second light-shielding section 320 is provided on the light-transmitting layer 318, and the other out of the first light-shielding sections 319 and the second light-shielding section 320 is provided on the second light-transmitting layer 23, which is composed of a light-transmitting material and is arranged so as to overlap the light-transmitting layer 318. When the light-controlling sheet 317 is manufactured, it is sufficient for one out of the first light-shielding sections 319 and the second light-shielding section 320 to be continuously provided on one surface of the light-transmitting layer 318, and the other out of the first light-shielding sections 319 and the second light-shielding section 320 to be continuously provided on one surface of the second light-transmitting layer 23, and for these to be arranged so as to overlap the light-transmitting layer 318 and the second light-transmitting layer 23. Consequently, it is unlikely that deviation will occur in the positional relationship between the first light-shielding sections 319 and the second light-shielding section 320 compared to the case where the first light-shielding sections are provided on one surface of the light-transmitting layer and then the light-transmitting layer is inverted for the second light-shielding section to be provided on the other surface.

Furthermore, in the light-transmitting layer 318, the second light-shielding section 320 is provided on the surface at the opposite side to the LED 313 side, whereas in the second light-transmitting layer 23, the first light-shielding sections 319 are provided on the surface at the opposite side to the LED 313 side and are arranged so as to overlap the LED 313 side of the light-transmitting layer 318. With this configuration, the second light-transmitting layer 23 is arranged at the side nearest the LEDs 313 in the light-controlling sheet 317. Consequently, the second light-transmitting layer 23 is able to suppress a member arranged at the LED 313 side of the light-controlling sheet 317 from interfering with the first light-shielding sections 319.

Embodiment 5

Embodiment 5 of the present disclosure will be described using FIG. 7. In embodiment 5, the configuration of a light-controlling sheet 417 and so forth has been altered from the aforementioned embodiment 4. Note that duplicate descriptions of structures, actions, and effects similar to those of the aforementioned embodiment 4 are omitted.

Figure 7:
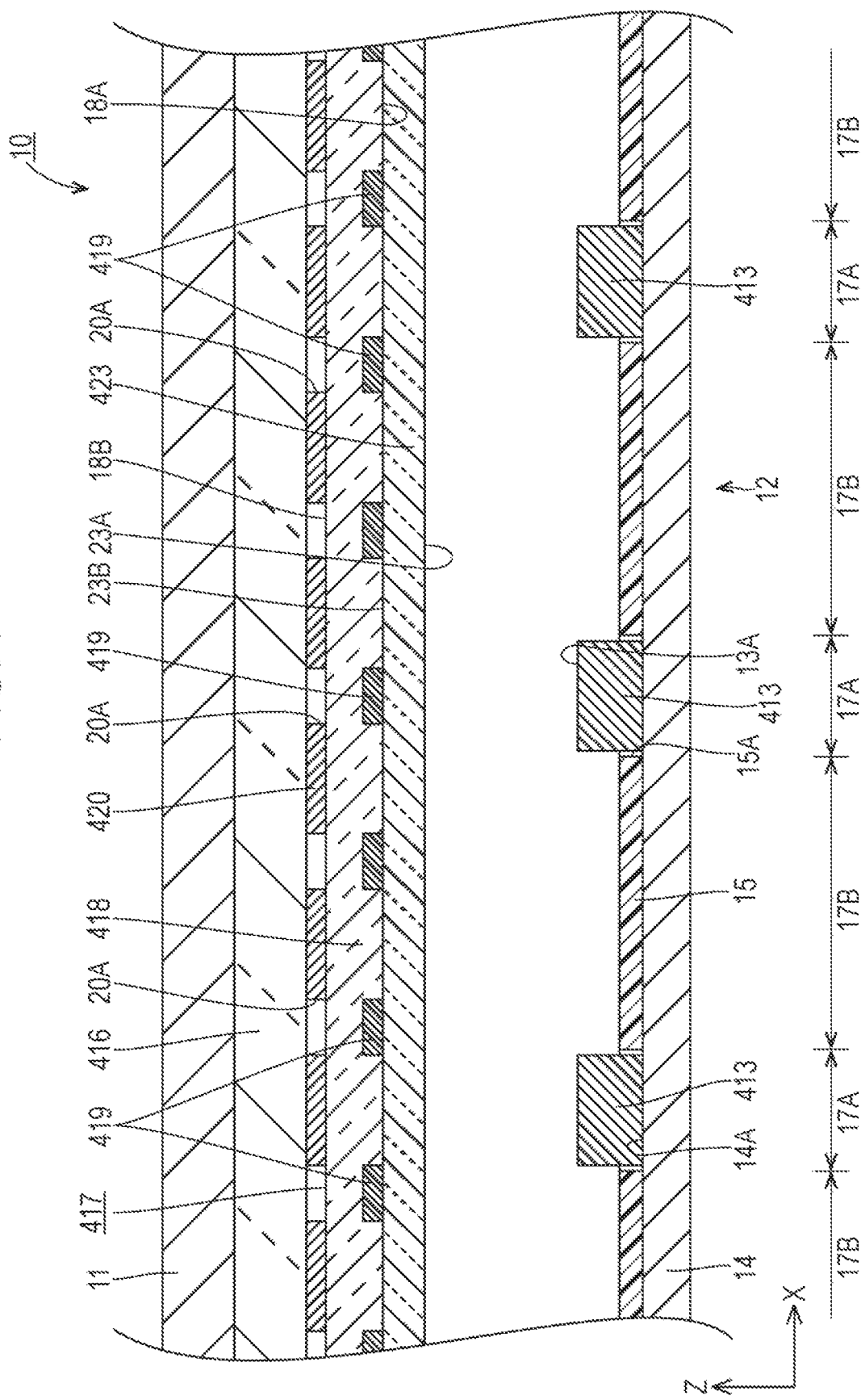
FIG. 7 is a cross-sectional view of a liquid crystal display device according to embodiment 5 of the present disclosure.

As depicted in FIG. 7, in the light-controlling sheet 417 according to the present embodiment, a second light-transmitting layer 423 includes a phosphor that converts the wavelength of primary light emitted from LEDs 413 and emits secondary light. Together with this, the LEDs 413 are altered to have a configuration that emits primary light (excitation light) the wavelength of which is converted by the phosphor included in the second light-transmitting layer 423. Specifically, the LEDs 413 have a configuration in which blue LED chips (blue LED elements) that emit blue light are sealed within a case using a sealing material that does not contain a phosphor, and thereby perform monochromatic emission of blue light, which is the primary light. The blue light mentioned here is constituted by visible light rays of a wavelength range belonging to blue (approximately 400 nm to approximately 500 nm). In contrast, the second light-transmitting layer 423 includes, as phosphors, a green phosphor that converts the wavelength of blue light to emit green light, and a red phosphor that converts the wavelength of blue light to emit red light. The green phosphor and the red phosphor included in the second light-transmitting layer 423 are down-conversion types (down-shifting types) with which the excitation wavelength is a shorter wavelength than the fluorescence wavelength. The green light mentioned here is constituted by visible light rays of a wavelength range belonging to green (approximately 500 nm to approximately 570 nm), and the red light is constituted by visible light rays of a wavelength range belonging to red (approximately 600 nm to approximately 780 nm). A quantum dot phosphor is preferably used as the green phosphor and the red phosphor included in the second light-transmitting layer 423. A quantum dot phosphor has discrete energy levels by confining electrons/positive holes and excitons in all directions in three-dimensional space within nano-sized semiconductor crystal (approximately 2 nm to 10 nm in diameter, for example), and, by changing the dot size thereof, it is possible for the peak wavelength (light emission color) and so forth of the emitted light to be selected as appropriate. The emitted light (fluorescent light) of a quantum dot phosphor has a sharp peak in the emission spectrum and a narrow half width, and therefore the color purity is extremely high and the color gamut is wide.

According to such a configuration, when the blue light emitted from the LEDs 413 is incident on the second light-transmitting layer 423, the wavelengths of a portion thereof are converted into green light and red light by the green phosphor and the red phosphor. Consequently, the light that is incident on a light-transmitting layer 418 includes blue light that has not been wavelength-converted in the second light-transmitting layer 423 and green light and red light that has been wavelength-converted in the second light-transmitting layer 423, and therefore the outgoing light from the light-transmitting layer 418 becomes white light as a result of the addition and color-mixing of this light. In this way, the light-controlling sheet 417 according to the present embodiment has a wavelength conversion function in addition to a light-controlling function and achieves an increase in functionality, and it is therefore possible to reduce the number of sheets used for an optical sheet 416 compared to the case where a wavelength conversion sheet having a wavelength conversion function is added to the optical sheet 416.

According to the present embodiment as described above, the second light-transmitting layer 423 includes phosphors that convert the wavelength of primary light emitted from the LEDs 413 and emits secondary light. With this configuration, although a portion of the primary light emitted from the LEDs 413 is wavelength-converted into secondary light by phosphors included in the second light-transmitting layer 423, a portion thereof passes through the second light-transmitting layer 423 without being wavelength-converted, and is then blocked by light-shielding sections 419 and 420 or passes through the light-transmitting layer 418. It is thereby possible to achieve an increase in functionality of the light-controlling sheet 417. Furthermore, it is unlikely that the light-controlling functions of the light-shielding sections 419 and 420 will be impaired by the phosphors included in the second light-transmitting layer 423 compared to the case where the second light-transmitting layer is made to have a function for diffusing light or the like.

Embodiment 6

Embodiment 6 of the present disclosure will be described using FIG. 8. In embodiment 6, the configuration of a light-controlling sheet 517 has been altered from the aforementioned embodiment 4. Note that duplicate descriptions of structures, actions, and effects similar to those of the aforementioned embodiment 4 are omitted.

Figure 8:
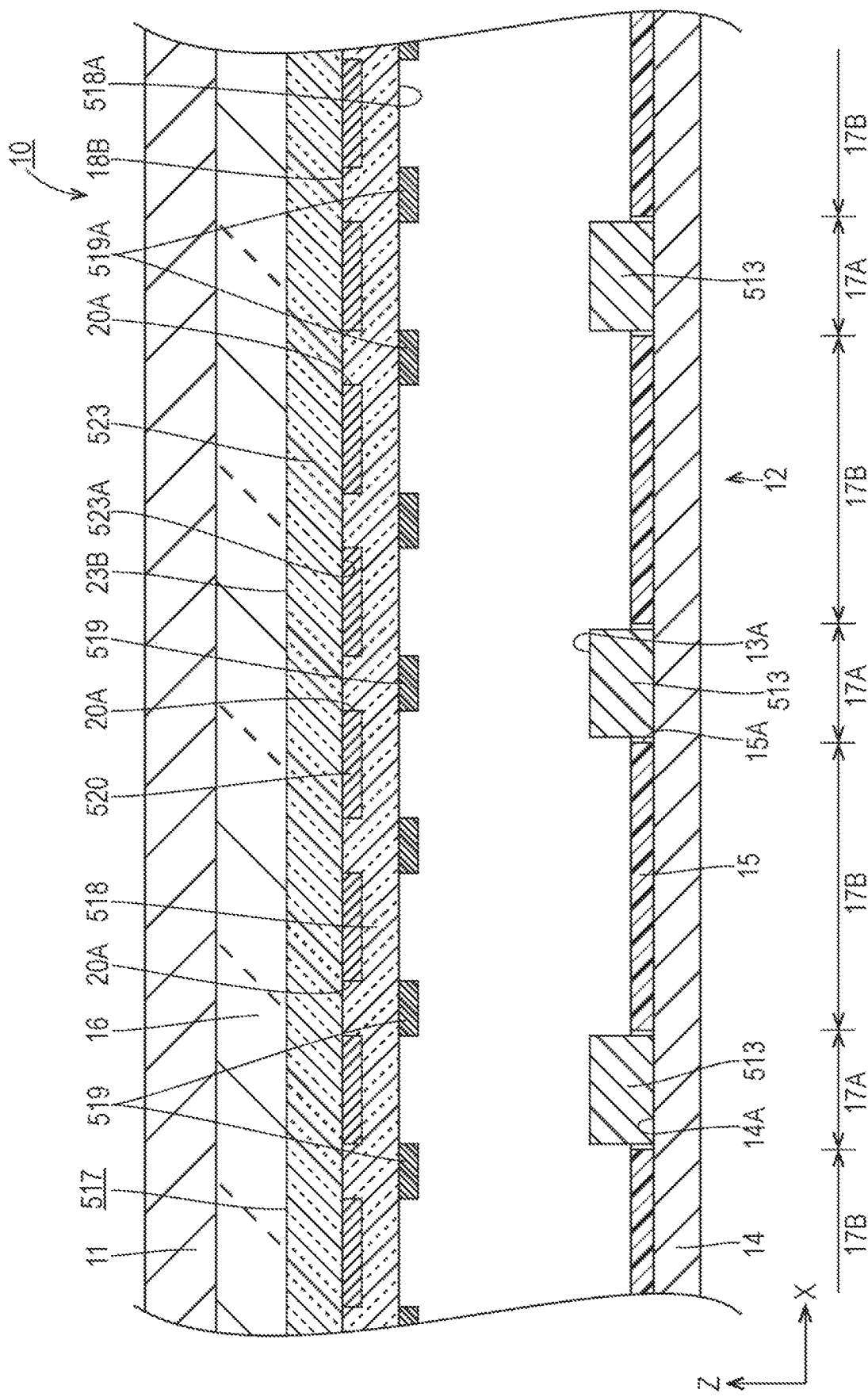
FIG. 8 is a cross-sectional view of a liquid crystal display device according to embodiment 6 of the present disclosure.

As depicted in FIG. 8, the light-controlling sheet 517 according to the present embodiment has a configuration in which a second light-transmitting layer 523 is arranged so as to overlap the front side of a light-transmitting layer 518. Together with this, from among first light-shielding sections 519 and a second light-shielding section 520, the first light-shielding sections 519 are provided on an incoming-light surface 518A of the light-transmitting layer 518, and the second light-shielding section 520 is provided on an incoming-light surface 523A (the surface at the LED 513 side) of the second light-transmitting layer 523. According to such a configuration, the second light-transmitting layer 523 is arranged at the furthest side from the LED 513 side in the light-controlling sheet 517. Consequently, regardless what kind the optical function is implemented in the second light-transmitting layer 523, it is possible to avoid the light-controlling function of the light-shielding sections 519 and 520 being impaired.

According to the present embodiment described above, the light-transmitting layer 518 is provided with the first light-shielding sections 519 on the surface at the LED 513 side, whereas the second light-transmitting layer 523 is arranged so as to overlap the light-transmitting layer 518 at the opposite side to the LED 513 side and is provided with the second light-shielding section 520 on the surface at the LED 513 side. With this configuration, the second light-transmitting layer 523 is arranged at the side furthest from the LED 513 side in the light-controlling sheet 517. Consequently, regardless what kind the optical function is implemented in the second light-transmitting layer 523, it is possible to avoid the light-controlling function of the light-shielding sections 519 and 520 being impaired.

Embodiment 7

Embodiment 7 of the present disclosure will be described using FIG. 9. In embodiment 7, a light-controlling sheet 617 has been altered from the aforementioned embodiment 6. Note that duplicate descriptions of structures, actions, and effects similar to those of the aforementioned embodiment 6 are omitted.

Figure 9:
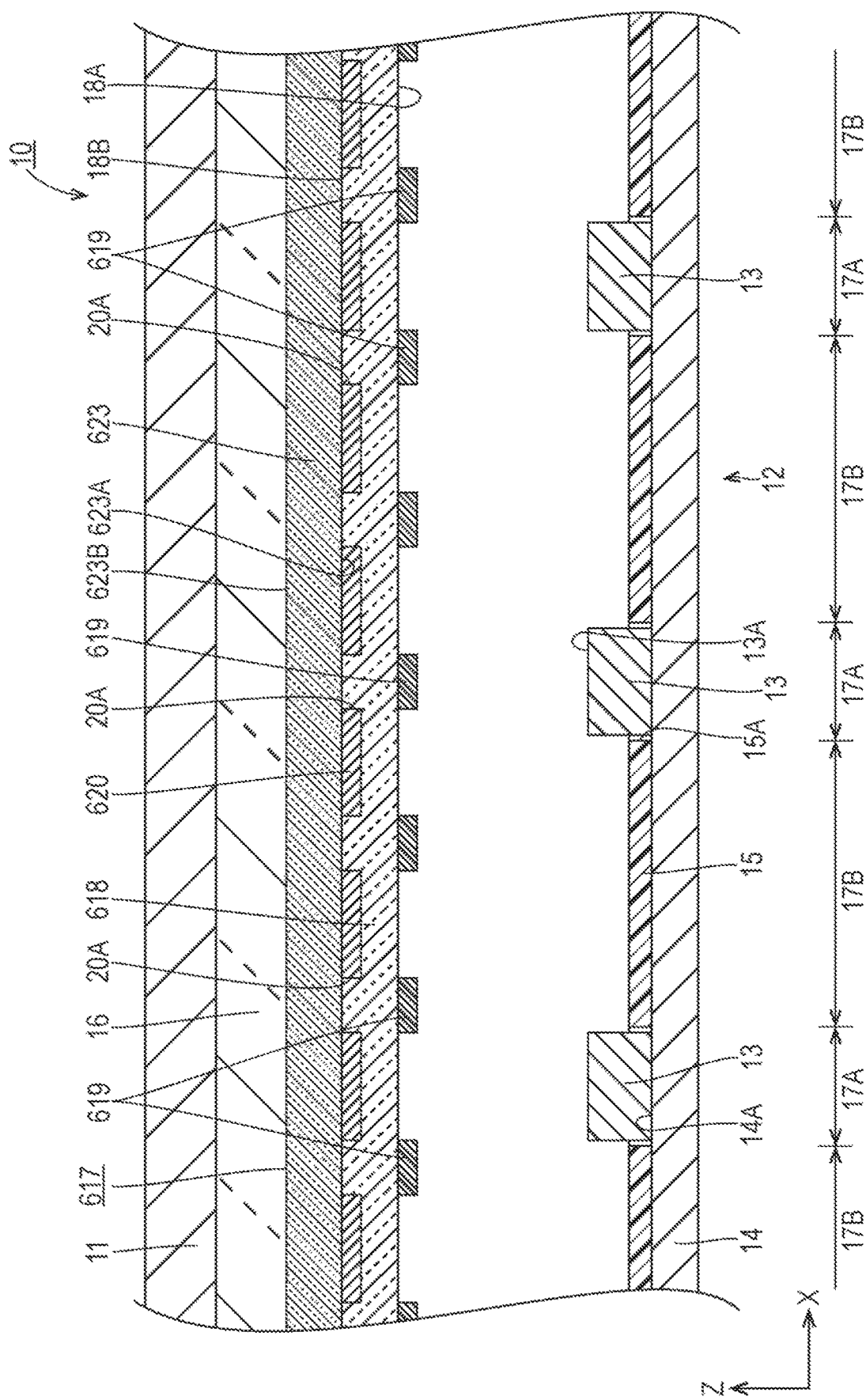
FIG. 9 is a cross-sectional view of a liquid crystal display device according to embodiment 7 of the present disclosure.

As depicted in FIG. 9, in the light-controlling sheet 617 according to the present embodiment, a second light-transmitting layer 623 has a light-diffusing function with which light is diffused. For the second light-transmitting layer 623 to have a light-diffusing function, light-diffusing particles that diffuse light may be dispersed and mixed within the second light-transmitting layer 623, for example, or aside therefrom a rough surface that diffuses light may also be formed on an incoming-light surface 623A and an outgoing-light surface 623B of the second light-transmitting layer 623. Either way, if the second light-transmitting layer 623 is made to have a light-diffusing function, light that has passed through a light-transmitting layer 618 exits outside while being diffused when passing through the second light-transmitting layer 623. It is thereby possible for luminance irregularities to be more suitably suppressed without the light-controlling function of the light-shielding sections 619 and 620 being impaired.

According to the present embodiment as described above, the second light-transmitting layer 623 has a light-diffusing function that diffuses light. With this configuration, light that has passed through the light-transmitting layer 618 exits outside while being diffused when passing through the second light-transmitting layer 623. It is thereby possible for luminance irregularities to be more suitably suppressed without the light-controlling function of the light-shielding sections 619 and 620 being impaired.

Embodiment 8

Embodiment 8 of the present disclosure will be described using FIG. 10. In embodiment 8, the configuration of first light-shielding sections 719 and a second light-shielding section 720 have been altered from that in the aforementioned embodiment 1. Note that duplicate descriptions of structures, actions, and effects similar to those of the aforementioned embodiment 1 are omitted.

Figure 10:
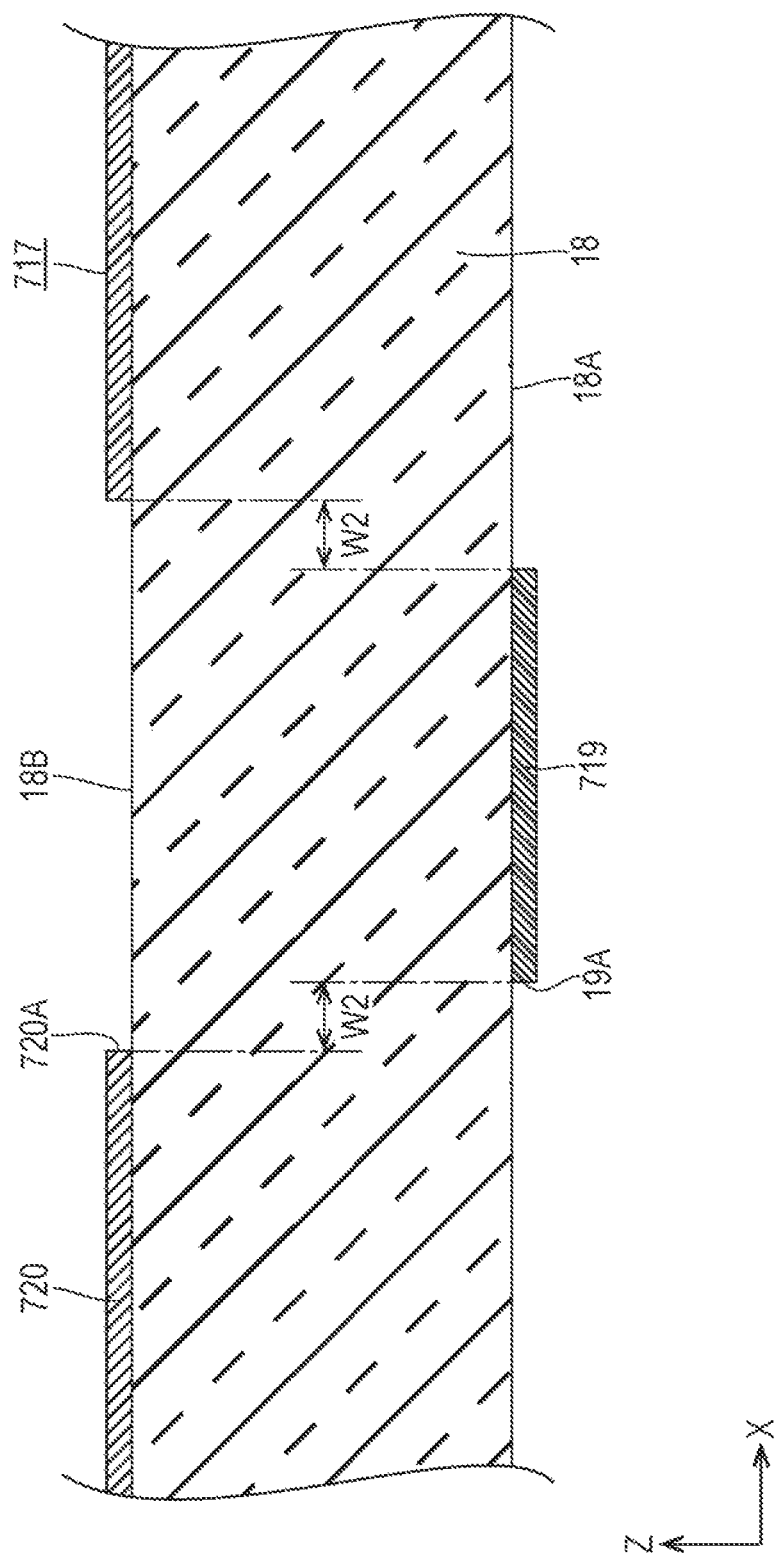
FIG. 10 is an enlarged cross-sectional view of a light-controlling sheet according to embodiment 8 of the present disclosure.

As depicted in FIG. 10, the first light-shielding sections 719 and the second light-shielding section 720 according to the present embodiment are arranged so that there are gaps between boundary portions. In detail, the first light-shielding sections 719 have a planar shape that is a perfect circle, and the outer peripheral end sections thereof are arranged so that there is a gap across the whole circumference with respect to the opening edge sections of openings 720A in the second light-shielding section 720. That is, the surface of this light-controlling sheet 717 is divided into light-shielding section non-arrangement regions in which the first light-shielding sections 719 and the second light-shielding section 720 are not arranged, in addition to the first light-shielding section arrangement regions and the second light-shielding section arrangement regions described in the aforementioned embodiment 1. These light-shielding section non-arrangement regions have an annular shape (donut shape) in plan view, and the width W2 thereof is substantially uniform across the whole circumference. According to the present embodiment, the amount of outgoing light from the light-controlling sheet 717 increases by an amount commensurate to the light-shielding section non-arrangement regions, which is therefore suitable for improving luminance.

Embodiment 9

Embodiment 9 of the present disclosure will be described using FIG. 11. In embodiment 9, the configuration of first light-shielding sections 819 and a second light-shielding section 820 have been altered from that in the aforementioned embodiment 1. Note that duplicate descriptions of structures, actions, and effects similar to those of the aforementioned embodiment 1 are omitted.

Figure 11:
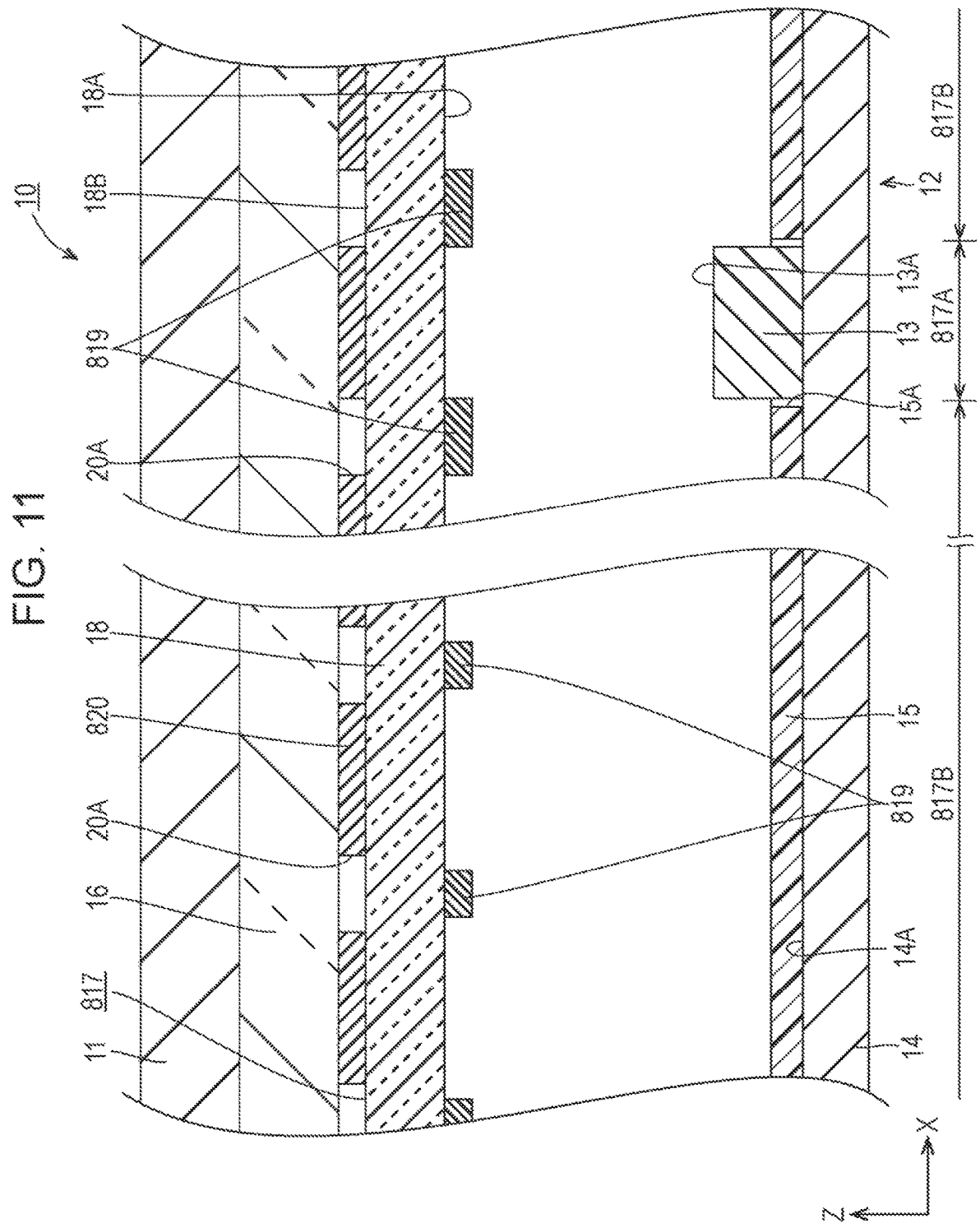
FIG. 11 is a cross-sectional view of a liquid crystal display device according to embodiment 9 of the present disclosure.

In a light-controlling sheet 817 according to the present embodiment, as depicted in FIG. 11, in LED arrangement regions 817A, the first light-shielding sections 819 and the second light-shielding section 820 are arranged so that the boundary portions thereof overlap, whereas in LED non-arrangement regions 817B, the first light-shielding sections 819 and the second light-shielding section 820 are arranged so that there is a gap between the boundary portions thereof. That is, in the LED arrangement regions 817A, the first light-shielding sections 819 and the second light-shielding section 820 have an arrangement similar to that in the aforementioned embodiment 2 (see FIG. 4), whereas in the LED non-arrangement regions 817B, the first light-shielding sections 819 and the second light-shielding section 820 have an arrangement similar to that in the aforementioned embodiment 8 (see FIG. 10). According to such a configuration, the exiting of light in the LED arrangement regions 817A where there is a large amount of light is further suppressed, whereas the exiting of light in the LED non-arrangement regions 817B where there is a small amount of light is further facilitated, which is more suitable for suppressing luminance irregularities.

Other Embodiments

The present disclosure is not restricted to the embodiments described in the aforementioned description and drawings, and embodiments such as the following are also included in the technical scope of the present disclosure.

Figure 12A:
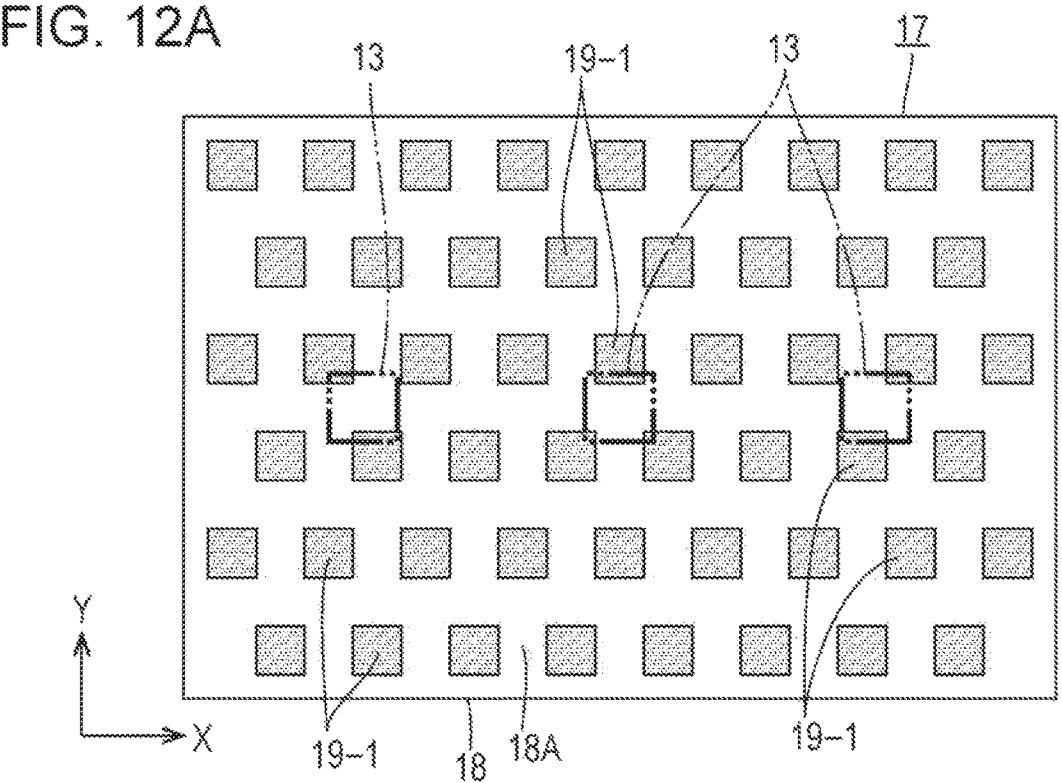
FIG. 12A is a bottom view of a light-controlling sheet according to another embodiment (1) of the present disclosure.
Figure 12B:
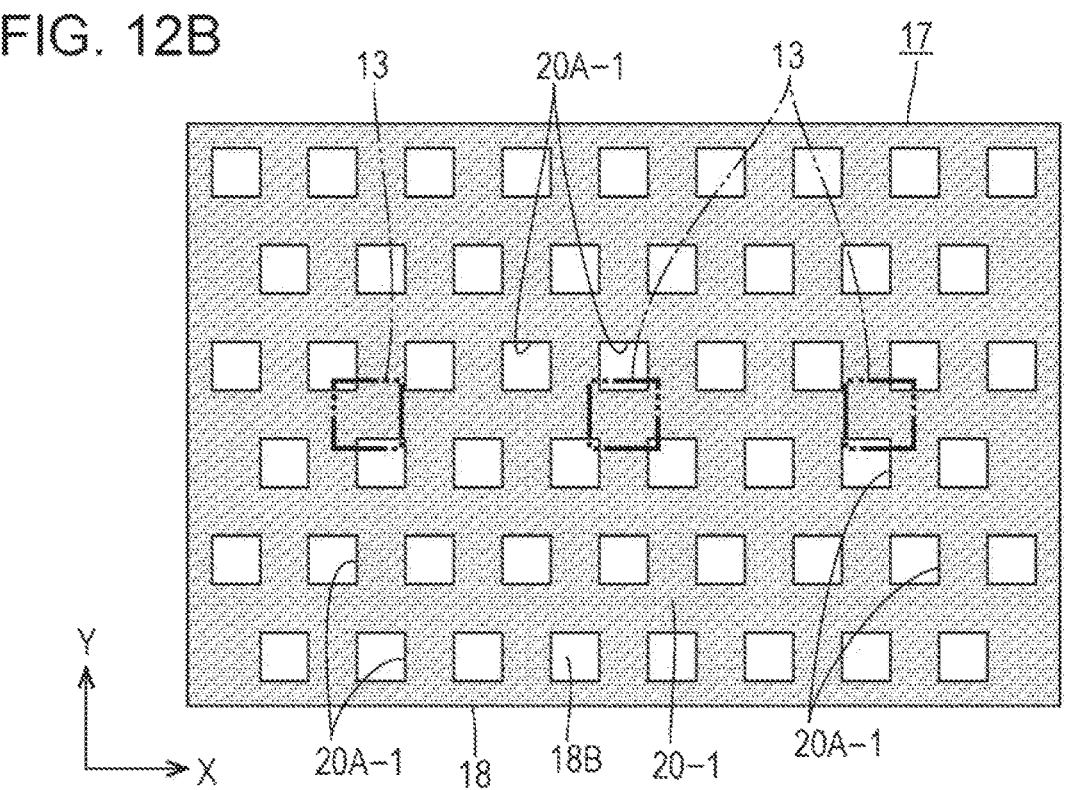
FIG. 12B is a plan view of the light-controlling sheet.

(1) Other than the aforementioned embodiments, it is possible for the planar shapes of the first light-shielding sections and the second light-shielding section to be altered as appropriate. For example, as depicted in FIG. 12A, it is also possible for the planar shape of first light-shielding sections 19-1 to be square. In this case, as depicted in FIG. 12B, a second light-shielding section 20-1 has a configuration in which openings 20A-1 having a square planar shape are arranged in a dispersed manner in a staggered form.

Figure 13A:
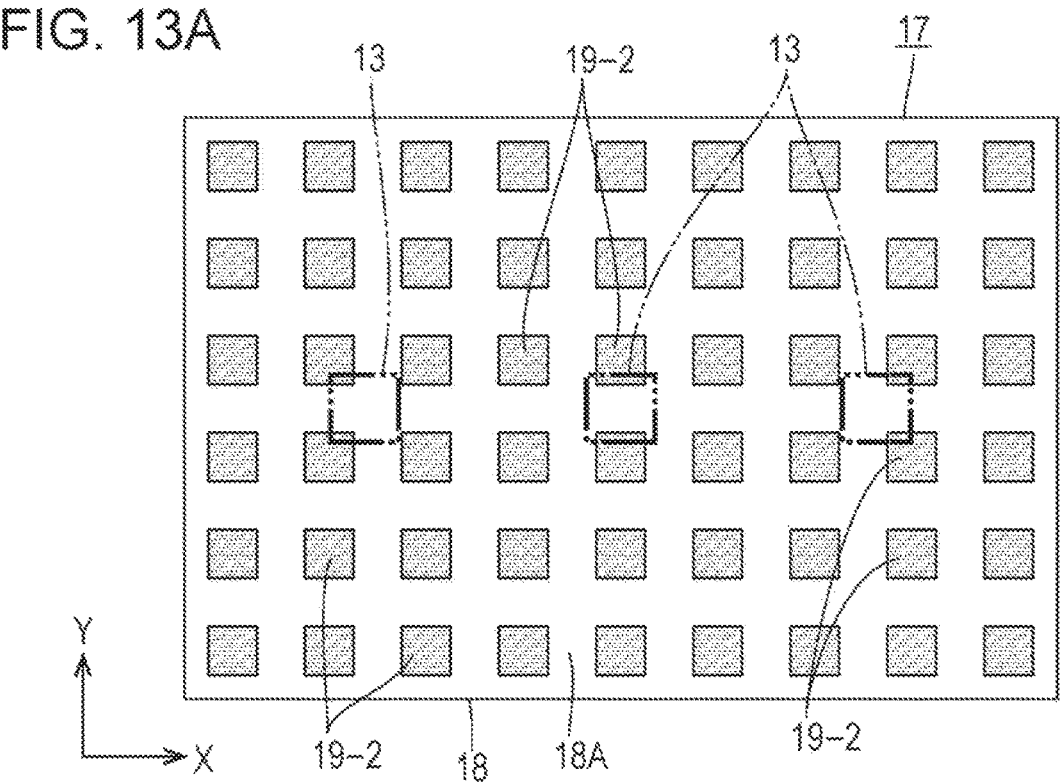
FIG. 13A is a bottom view of a light-controlling sheet according to another embodiment (2) of the present disclosure.
Figure 13B:
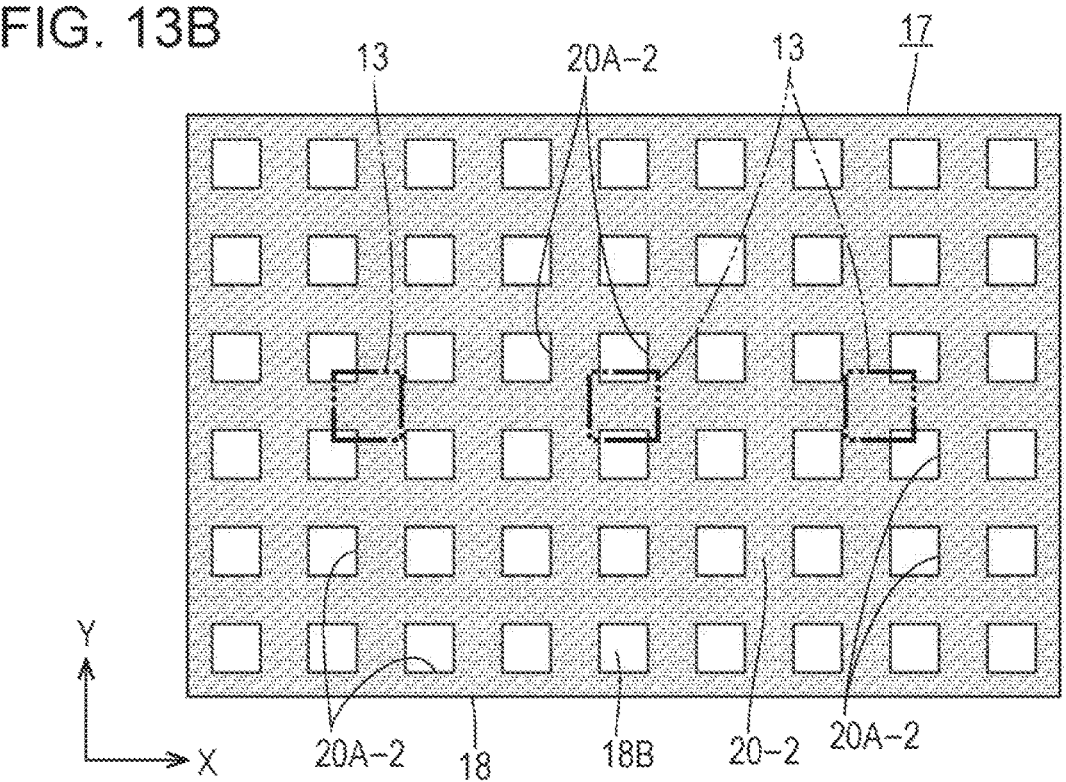
FIG. 13B is a plan view of the light-controlling sheet.

(2) Other than the aforementioned (1), as depicted in FIG. 13A, first light-shielding sections 19-2 having a square planar shape may be arranged side-by-side in a matrix form. A plurality of first light-shielding sections 19-2 are arranged side-by-side in the X axis direction and the Y axis direction. As depicted in FIG. 13B, a second light-shielding section 20-2 has a configuration in which openings 20A-2 having a square planar shape are arranged in a dispersed manner in a matrix form.

Figure 14A:
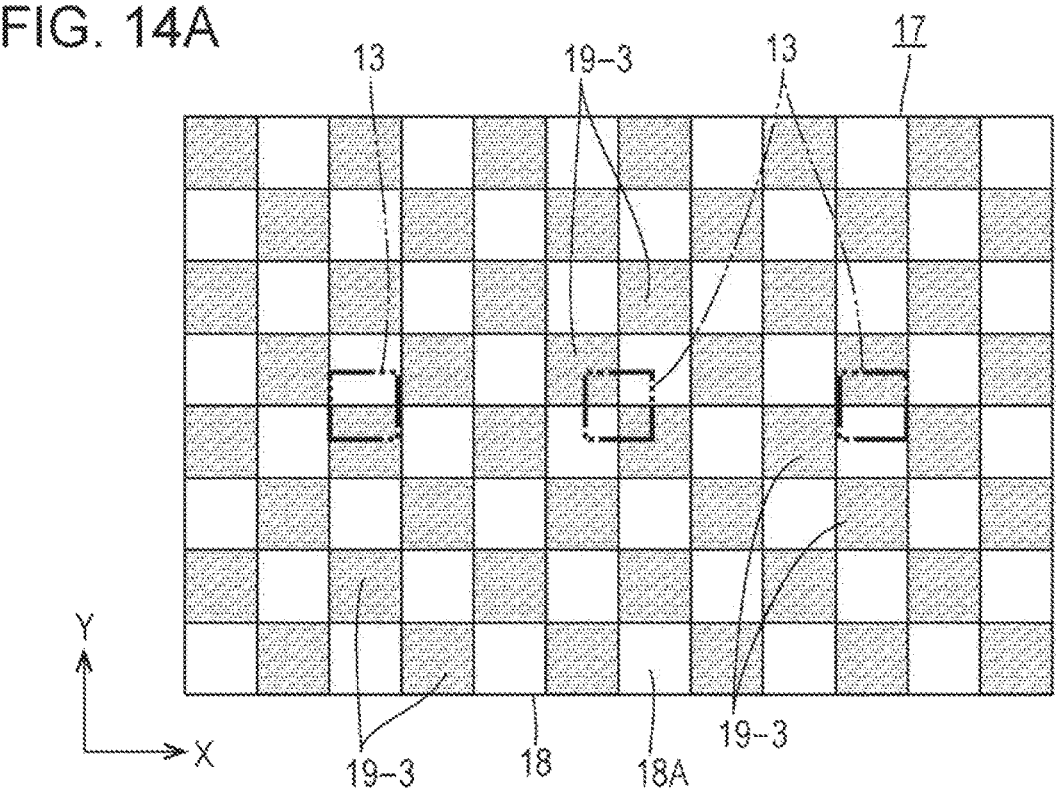
FIG. 14A is a bottom view of a light-controlling sheet according to another embodiment (3) of the present disclosure.
Figure 14B:
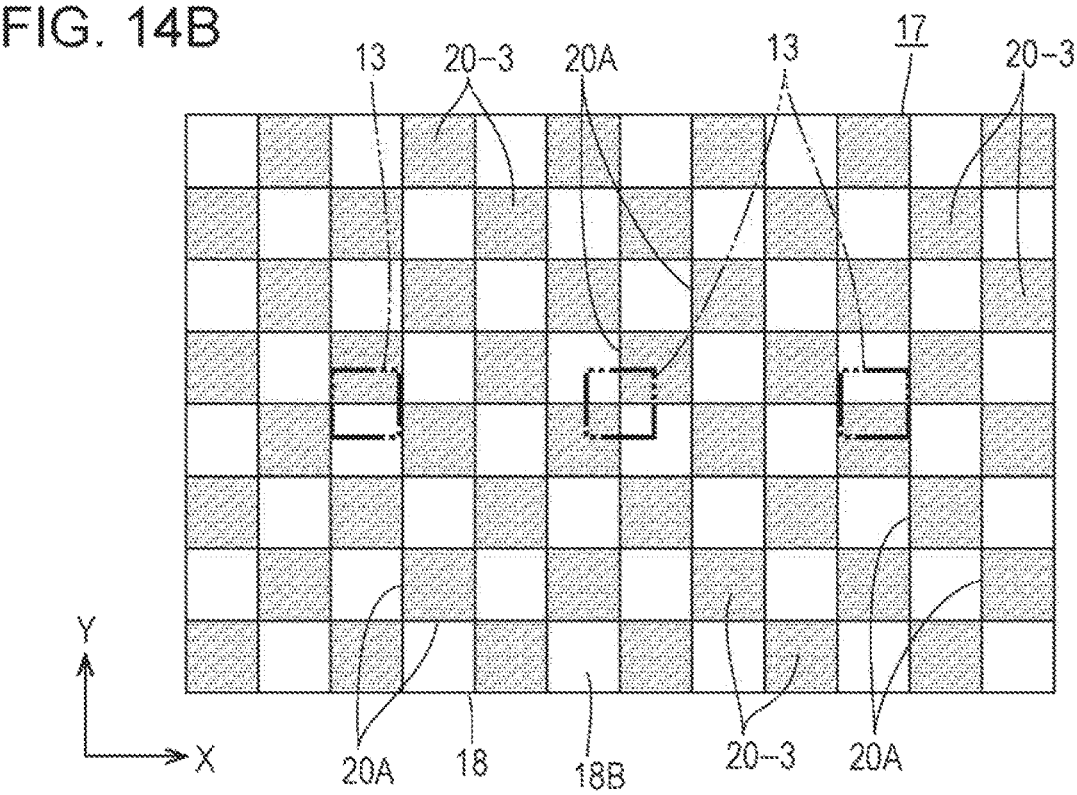
FIG. 14B is a plan view of the light-controlling sheet.

(3) Other than the aforementioned (1) and (2), as depicted in FIGS. 14A and 14B, a checkered arrangement may be adopted so that first light-shielding sections 19-3 and second light-shielding sections 20-3 are repeatedly arranged side-by-side in an alternating manner in the X axis direction and the Y axis direction. In this case, the areas occupied by the first light-shielding sections 19-3 and the second light-shielding sections 20-3 are equal.

Figure 15A:
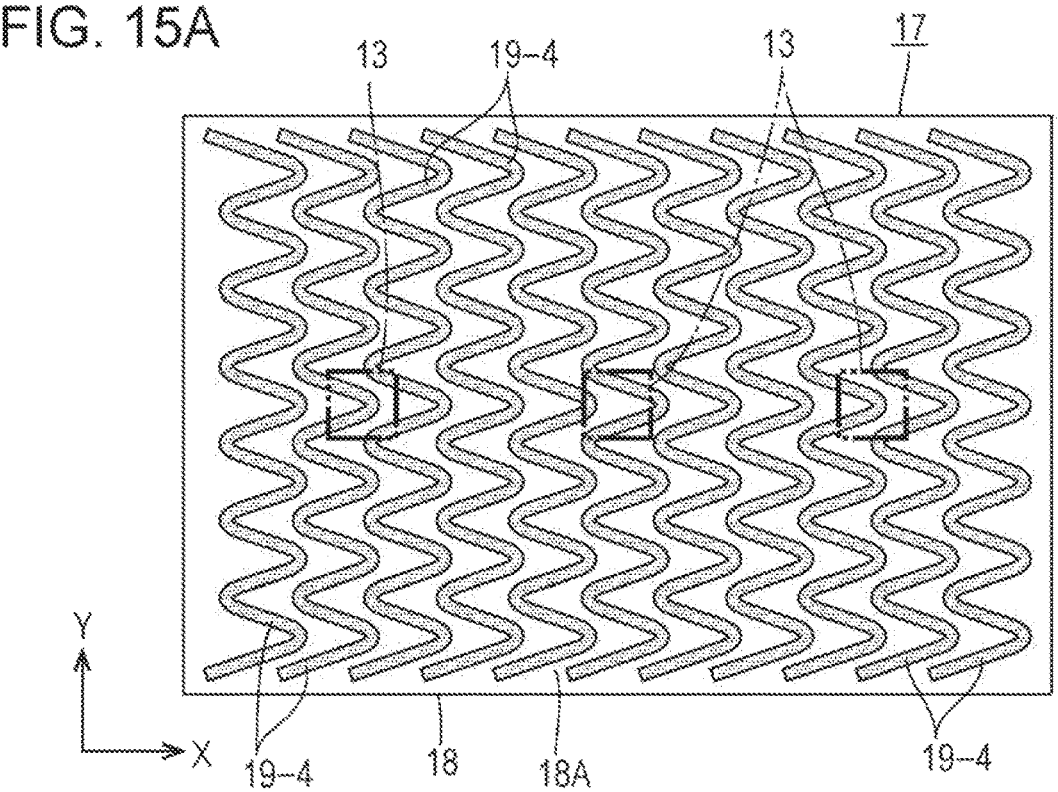
FIG. 15A is a bottom view of a light-controlling sheet according to another embodiment (4) of the present disclosure.
Figure 15B:
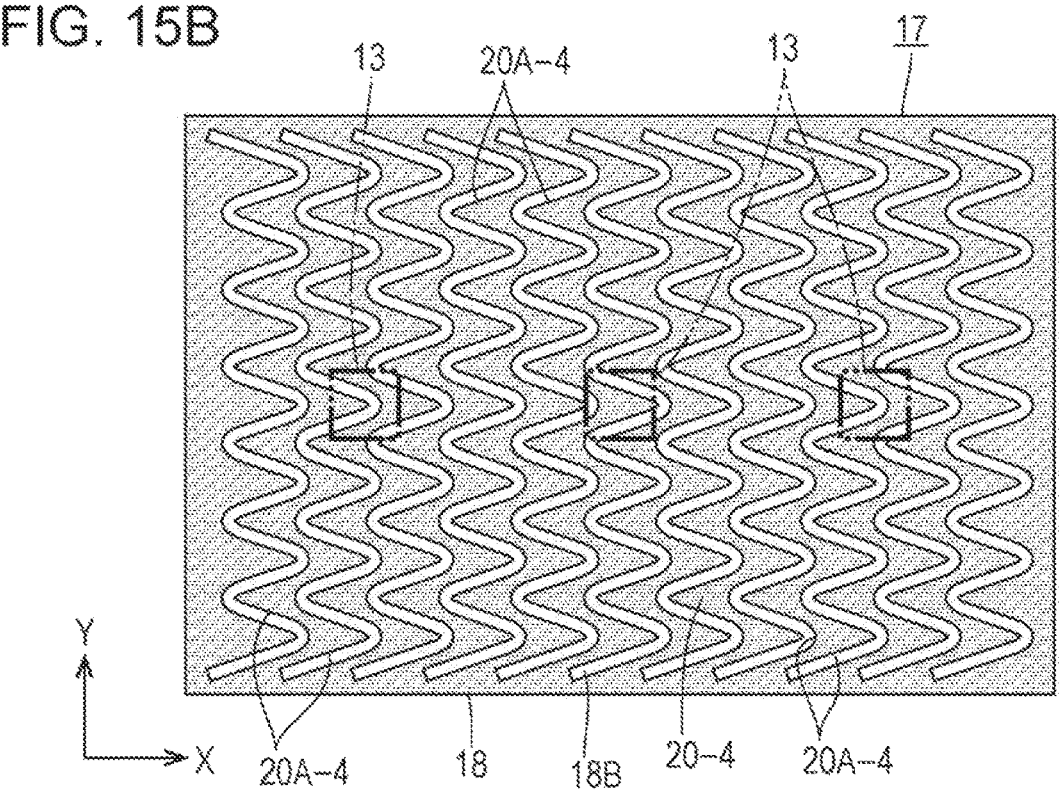
FIG. 15B is a plan view of the light-controlling sheet.

(4) Other than the aforementioned (1) to (3), as depicted in FIG. 15A, first light-shielding sections 19-4 may have a shape that meanders in a wave-like manner (a form in which the bent sections are curved) in plan view. The first light-shielding sections 19-4 have a shape that repeatedly meanders midway while extending in the Y axis direction, and a plurality thereof are arranged side-by-side with gaps therebetween in the X axis direction. As depicted in FIG. 15B, a second light-shielding section 20-4 has a configuration in which a plurality of openings 20A-4 having a planar shape that meanders in a wave-like manner are arranged side-by-side with gaps therebetween in the X axis direction.

Figure 16A:
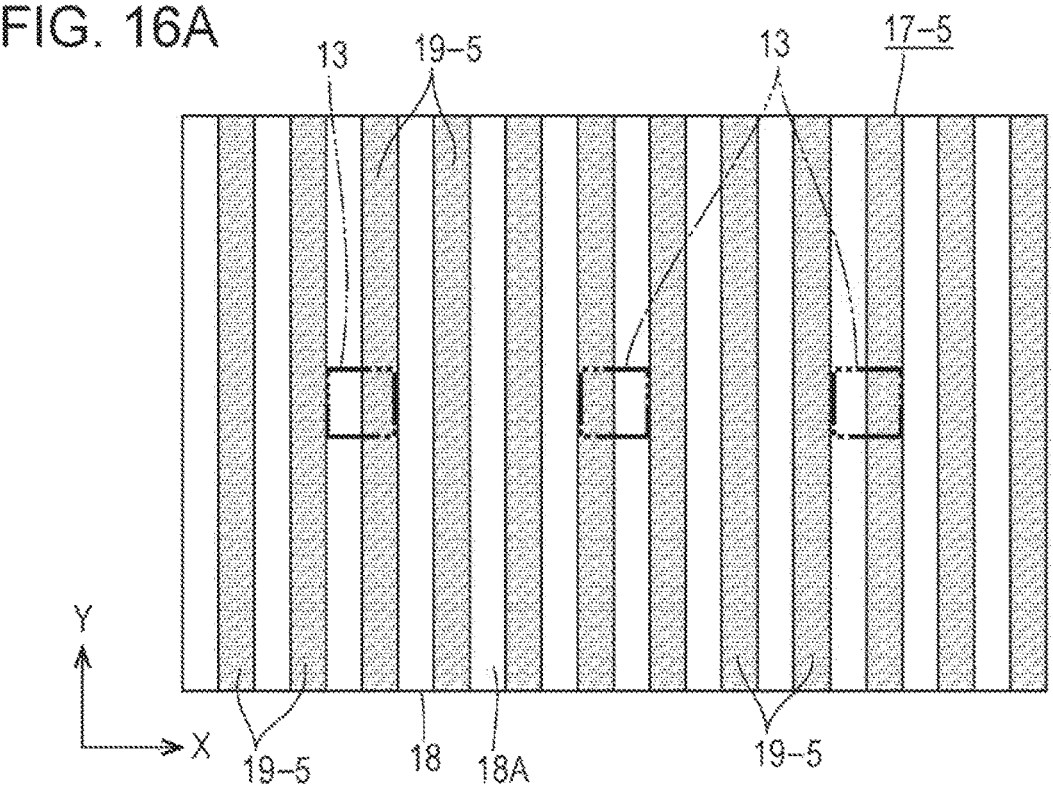
FIG. 16A is a bottom view of a light-controlling sheet according to another embodiment (5) of the present disclosure.
Figure 16B:
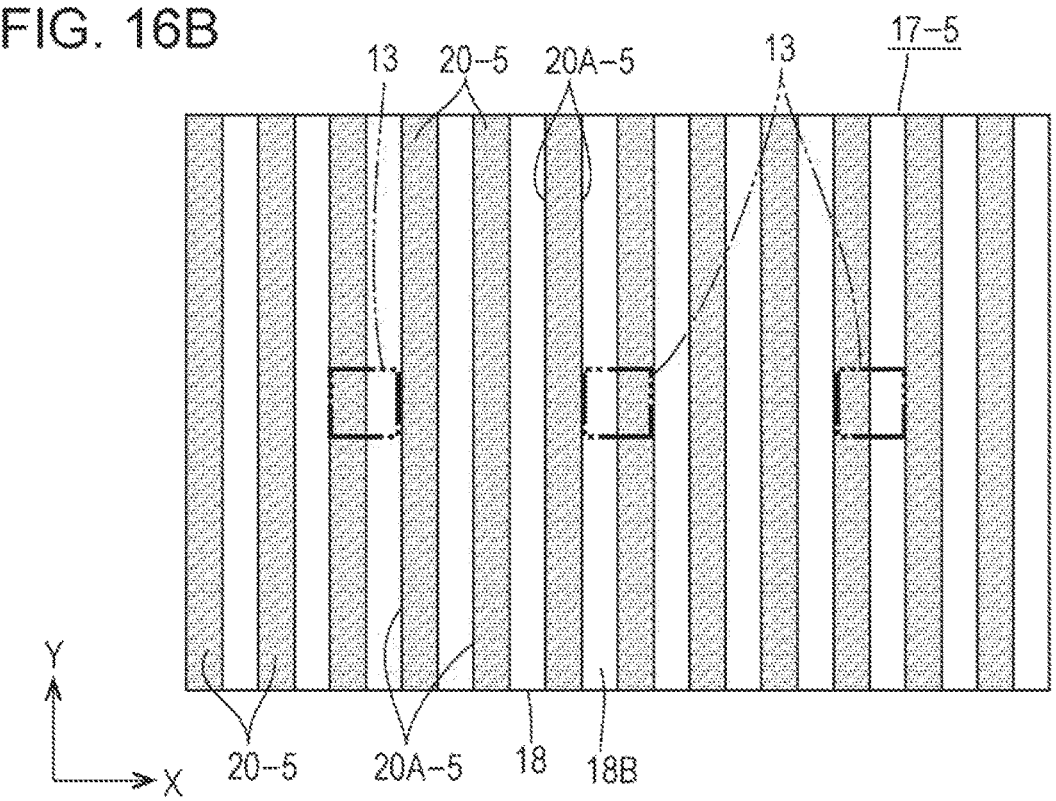
FIG. 16B is a plan view of the light-controlling sheet.

(5) Other than the aforementioned (1) to (4), as depicted in FIG. 16A, first light-shielding sections 19-5 may have a vertically-long strip shape that extends in the Y axis direction. The first light-shielding sections 19-5 extend across the whole length of a light-controlling sheet 17-5 in the Y axis direction, and a plurality thereof are arranged side-by-side with gaps therebetween in the X axis direction. As depicted in FIG. 16B, a second light-shielding section 20-5 has a configuration in which a plurality of openings 20A-5 having a planar shape that is a vertically-long strip shape are arranged side-by-side with gaps therebetween in the X axis direction.

Figure 17:
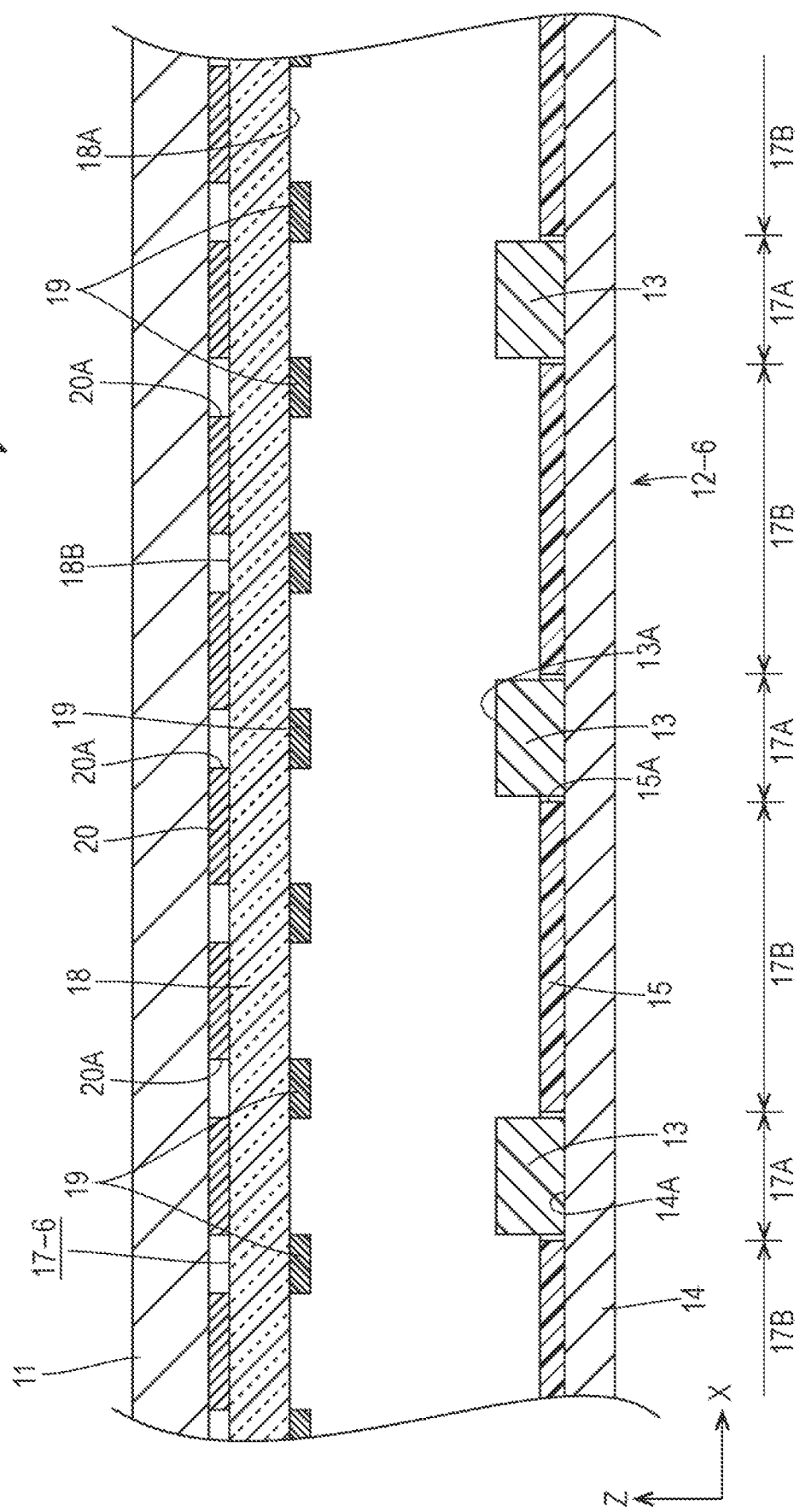
FIG. 17 is a cross-sectional view of a liquid crystal display device according to another embodiment (6) of the present disclosure.

(6) The aforementioned embodiments described a backlight device provided with an optical sheet; however, as depicted in FIG. 17, a backlight device 12-6 that does not include an optical sheet is also possible. Even with the backlight device 12-6 not including an optical sheet, outgoing light having a sufficiently small amount of luminance irregularities can be obtained using a light-controlling sheet 17-6.

Figure 18:
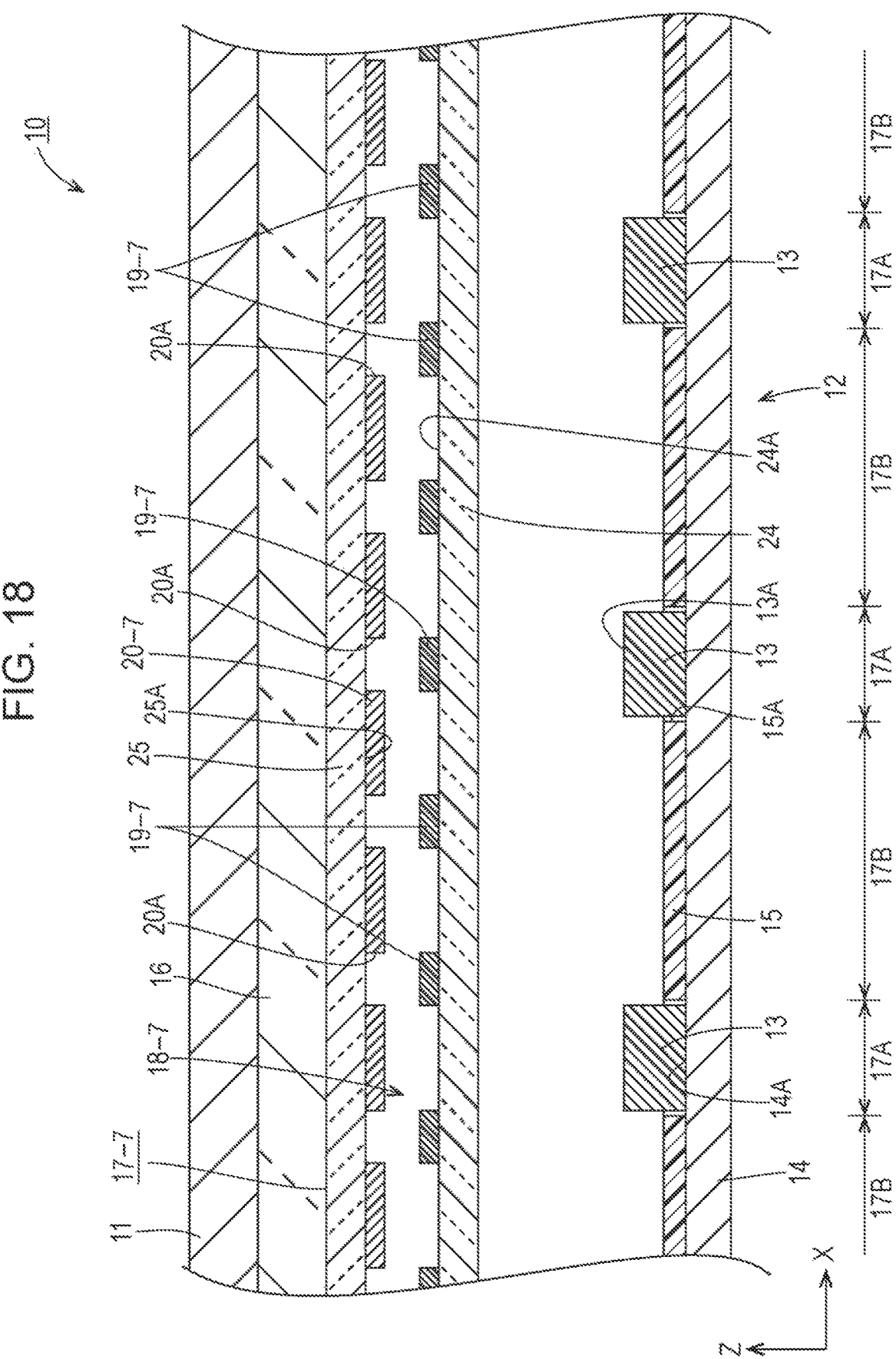
FIG. 18 is a cross-sectional view of a liquid crystal display device according to another embodiment (7) of the present disclosure.

(7) The aforementioned embodiments described the case where a light-transmitting layer arranged between first light-shielding sections and a second light-shielding section is composed of a light-transmitting material; however, as depicted in FIG. 18, a light-transmitting layer 18-7 may be an air layer. In this case, a light-controlling sheet 17-7 has a configuration provided with a pair of light-transmitting sheets 24 and 25 arranged with the light-transmitting layer 18-7 interposing, in which first light-shielding sections 19-7 are provided on an outgoing-light surface 24A of one light-transmitting sheet 24 arranged at the rear side of the light-transmitting layer 18-7, and a second light-shielding section 20-7 is provided on an incoming-light surface 25A of the other light-transmitting sheet 25 arranged at the front side of the light-transmitting layer 18-7.

(8) Other than the aforementioned embodiments and (1) to (3), it is possible for the specific planar shapes of the first light-shielding sections and the second light-shielding section to be altered as appropriate. For example, other than a perfect circle or a square, the planar shape of the first light-shielding sections may be a rectangle, a trapezoid, a rhombus, a triangle, a polygon with five or more sides, and so forth. The openings in the second light-shielding section have the planar shape of the altered first light-shielding sections.

(9) The aforementioned (4) described the case where the first light-shielding sections and the openings in the second light-shielding section meander while extending in the Y axis direction; however, the first light-shielding sections and the openings in the second light-shielding section may have a planar shape that meanders while extending in the X axis direction. Furthermore, other than the case where the first light-shielding sections and the openings in the second light-shielding section meander in a wave-like manner, the first light-shielding sections and the openings in the second light-shielding section may have a planar shape that meanders so that the corners thereof are formed in the bent sections.

(10) The aforementioned (5) described the case where the first light-shielding sections and the openings in the second light-shielding section have a vertically-long strip shape that extends in the Y axis direction; however, the first light-shielding sections and the openings in the second light-shielding section may have a planar shape that is a horizontally-long strip shape extending in the X axis direction. Furthermore, the first light-shielding sections and the openings in the second light-shielding section may have a planar shape that is a strip shape that extends in a direction oblique to the X axis direction and the Y axis direction.

(11) The aforementioned embodiments (excluding the aforementioned (3)) described the case where the area occupied by the first light-shielding sections is larger than the area occupied by the second light-shielding section; however, the area occupied by the first light-shielding sections may be smaller than the area occupied by the second light-shielding section, or the areas occupied by the first light-shielding sections and the second light-shielding section may be equal. For example, it is also possible for the relationship between the first light-shielding sections and the second light-shielding section in each embodiment to be reversed.

(12) The aforementioned embodiments described the case where the light reflection rate in the first light-shielding sections and the second light-shielding section is higher than the light absorption rate; however, the light absorption rate in the first light-shielding sections and the second light-shielding section may be higher than the light reflection rate. For example, it is also possible for the material for the first light-shielding sections and the second light-shielding section to be an ink or the like that exhibits a black color having an excellent light absorption rate.

(13) Other than the aforementioned embodiments, it is possible for the specific material, forming method, and so forth for the first light-shielding sections and the second light-shielding section to be altered as appropriate. In this case, it is also possible for the material, forming method, and so forth to be different between the first light-shielding sections and the second light-shielding section. Furthermore, the first light-shielding sections and the second light-shielding section may transmit a fixed amount of light, but even in this case it is desirable for the light-shielding rate to be higher than the light-transmitting rate. That is, it is not necessary for the first light-shielding sections and the second light-shielding section to necessarily have a light-shielding rate that is substantially 100%.

(14) The aforementioned embodiments described the case where the length p of the first light-shielding sections is equal to "d*tan θc"; however, a configuration may be adopted where the length p of the first light-shielding sections is greater than "d*tan θc" (where "p>d"), or a configuration may be adopted where the length p of the first light-shielding sections is less than "d*tan θc" (where "p<d").

(15) The aforementioned embodiments 2 and 9 described the case where the outer peripheral end sections of the first light-shielding sections overlap across the whole circumference with the opening edge sections of the openings in the second light-shielding section; however, a configuration may be adopted where the outer peripheral end sections of the first light-shielding sections partially overlap in the circumferential direction with the opening edge sections of the openings in the second light-shielding section.

(16) The aforementioned embodiments 8 and 9 described the case where a gap is provided across the whole circumference between the outer peripheral end sections of the first light-shielding sections and the opening edge sections of the openings in the second light-shielding section; however, a configuration may be adopted where a gap is partially provided in the circumferential direction between the outer peripheral end sections of the first light-shielding sections and the opening edge sections of the openings in the second light-shielding section.

(17) It is also possible for the configurations of the aforementioned (1) to (5) to be combined with the configurations described in the aforementioned embodiments 2, 8, and 9.

(18) It is also possible for the support member described in the aforementioned embodiment 3 to be added to the aforementioned embodiments 6, 7, and so forth.

(19) The aforementioned embodiments 4 and 5 described the case where the first light-shielding sections are provided on the outgoing-light surface of the second light-transmitting layer; however, the first light-shielding sections may be provided on the incoming-light surface of the second light-transmitting layer.

(20) It is also possible for the protective layer described in the aforementioned embodiment 3 to be added to the aforementioned embodiments 4 and 5.

(21) The aforementioned embodiment 5 described the case where LEDs that emit blue light are used as light sources; however, it is also possible to use LEDs that emit light having a color other than blue as light sources, and in this case it is sufficient for the color exhibited by a phosphor contained in the second light-transmitting layer to also be altered according to the color of the light from the LEDs. For example, in a case where LEDs that emit magenta light are used, the illumination light (outgoing light) from the backlight device can be made to be white if a green phosphor that exhibits green, which is the complementary color for magenta, is used as a phosphor contained in the second light-transmitting layer.

(22) In addition to the aforementioned (21), in a case where LEDs that emit purple light are used, the illumination light (outgoing light) from the backlight device can be made to be white if a green phosphor and a yellow phosphor that exhibit yellow-green, which is the complementary color for purple, are used as phosphors contained in the second light-transmitting layer.

(23) In addition to the aforementioned (21) and (22), in a case where LEDs that emit cyan light are used, the illumination light (outgoing light) from the backlight device can be made to be white if a red phosphor that exhibits red, which is the complementary color for cyan, is used as a phosphor contained in the second light-transmitting layer.

(24) The aforementioned embodiments described the case where a configuration is adopted in which the second light-transmitting layer includes a green phosphor and a red phosphor; however, it is also possible to adopt a configuration in which only a yellow phosphor is included in the second light-transmitting layer, or a configuration in which a red phosphor and a green phosphor are included in addition to a yellow phosphor.

(25) The aforementioned embodiments gave examples for a configuration in which the second light-transmitting layer contains a quantum dot phosphor; however, another type of phosphor may be contained in the second light-transmitting layer. A possible example of another phosphor to be contained in the second light-transmitting layer is a sulfide phosphor but there is not necessarily any restriction thereto.

(26) The aforementioned embodiments 6 and 7 described the case where the second light-shielding section is provided on the incoming-light surface of the second light-transmitting layer; however, the second light-shielding section may be provided on the outgoing-light surface of the second light-transmitting layer.

(27) The aforementioned embodiment 7 described the case where the second light-transmitting layer has a light-diffusing function; however, aside therefrom, the second light-transmitting layer may be provided with a light-concentrating function with which light is concentrated, a polarizing reflecting function (luminance-improving function) with which light is polarized and reflected, or the like.

(28) Other than the aforementioned embodiments, it is possible for the specific number of LEDs arranged and the arrangement of the LEDs to be altered as appropriate. For example, a plurality of LEDs may be arranged side-by-side in the X axis direction and the Y axis direction in the surface of an LED substrate. In this case, the LEDs may be arrayed in a matrix form or may be arrayed in a staggered form.

(29) Other than the aforementioned embodiments, it is possible for the specific lamination order, type, number of laminated sheets, or the like for the optical sheet to be altered as appropriate. For example, it is also possible for the optical sheet to include a wavelength conversion sheet containing a phosphor such as that described in the aforementioned embodiment 5. In this case, similar to embodiment 5, it is preferable for LEDs that perform monochromatic emission of blue light to be used as light sources.

(30) The aforementioned embodiments described a backlight device provided with a reflection sheet; however, it is also possible to omit the reflection sheet. In this case also, it is possible to obtain a sufficient light utilization efficiency by light being reflected by a light-reflecting film formed on the surface of the LED substrate.

(31) The aforementioned embodiments described the case where LEDs are used as light sources; however, aside therefrom, it is also possible for organic EL elements, laser diodes, or the like to be used as light sources.

(32) The aforementioned embodiments gave examples for a liquid crystal panel as a display panel; however, another type of display panel (a MEMS (microelectromechanical systems) display panel or the like) may be used.

The present disclosure contains subject matter related to that disclosed in Japanese Priority Patent Application JP 2018-215677 filed in the Japan Patent Office on Nov. 16, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An illumination device comprising:

a light source; and a light-controlling member that is arranged at an exit side of an outgoing-light path of the light source, and has a light-transmitting layer that transmits light, a first light-shielding section that is arranged at a light source side of the light-transmitting layer, and a second light-shielding section that is arranged at an opposite side to a first light-shielding section side of the light-transmitting layer, wherein the first light-shielding section and the second light-shielding section are repeatedly arranged side-by-side in an alternating manner, wherein the light-transmitting layer is composed of a light-transmitting material that transmits light, and wherein when a thickness of the light-transmitting layer is taken as d, a critical angle based on a refractive index according to the light-transmitting material in the light-transmitting layer is taken as θc, and a length of the first light-shielding section is taken as p, the light-controlling member is configured so as to satisfy expression (1) given below $$p = d \cdot \tan \theta c \qquad (1).$$

* * * * *